(12) United States Patent
Owoeye

(10) Patent No.: US 12,352,510 B2
(45) Date of Patent: Jul. 8, 2025

(54) HEAT EXCHANGER WITH A UNIT-CELL

(71) Applicant: General Electric Company, Schenectady, NY (US)

(72) Inventor: Eyitayo James Owoeye, Houston, TX (US)

(73) Assignee: General Electric Company, Evendale, OH (US)

(*) Notice: Subject to any disclaimer, the term of this patent is extended or adjusted under 35 U.S.C. 154(b) by 369 days.

(21) Appl. No.: 17/872,746

(22) Filed: Jul. 25, 2022

(65) Prior Publication Data

US 2024/0027144 A1 Jan. 25, 2024

(51) Int. Cl.
| | | |
|---|---|---|
| *F28F 7/02* | (2006.01) | |
| *F28D 7/16* | (2006.01) | |
| *F28F 9/02* | (2006.01) | |

(52) U.S. Cl.
CPC ............. *F28F 7/02* (2013.01); *F28D 7/1607* (2013.01); *F28F 9/02* (2013.01)

(58) Field of Classification Search
CPC .... F16S 5/00; F16S 3/08; B33Y 80/00; B33Y 10/00; F28F 7/02; F28F 9/02; F28D 7/1607; F28D 7/0066; F28D 2021/0026; F28D 2021/0021
See application file for complete search history.

(56) References Cited

U.S. PATENT DOCUMENTS

| | | | |
|---|---|---|---|
| 8,659,896 B2 | 2/2014 | Dede et al. | |
| 9,513,066 B2 | 12/2016 | Wiebelt et al. | |
| 9,618,278 B2 | 4/2017 | Denkenberger | |
| 10,036,251 B2 | 7/2018 | Sub et al. | |
| 10,209,009 B2 | 2/2019 | Gerstler et al. | |
| 10,570,746 B2 | 2/2020 | Mongillo et al. | |
| 10,662,781 B2 | 5/2020 | Mongillo et al. | |
| 10,704,841 B2 * | 7/2020 | Manzo | B22F 3/1115 |
| 10,739,077 B2 | 8/2020 | Gerstler et al. | |
| 11,035,621 B2 | 6/2021 | Lassini et al. | |
| 2014/0251585 A1 | 9/2014 | Kusuda et al. | |
| 2016/0202003 A1* | 7/2016 | Gerstler | F28D 9/00 |
| 2018/0299066 A1* | 10/2018 | Erno | F16S 5/00 |
| 2020/0309469 A1 | 10/2020 | Maxwell et al. | |

* cited by examiner

*Primary Examiner* — Harry E Arant
(74) *Attorney, Agent, or Firm* — Dority & Manning, P.A.

(57) ABSTRACT

A heat exchanger including a plurality of unit-cells, each unit-cell defined by a body having a plurality of faces and corners. The heat exchanger includes a first set of channels formed in the body and a second set of channels formed in the body and having corner openings on each of the corners including a distribution chamber located at the center.

20 Claims, 23 Drawing Sheets

HEAT EXCHANGER WITH A UNIT-CELL

TECHNICAL FIELD

The present subject matter generally relates to a heat exchanger with cooling channels, and more specifically to a heat exchanger with a unit-cell.

BACKGROUND

An aircraft engine can include one or more heat exchangers. Heat exchangers can be used to transfer heat from a relatively hotter fluid to a relatively colder fluid. The heat transfer effectiveness of the heat exchangers is determined, at least in part, by the flow of the heat transfer fluids through the heat exchangers. Additionally, some systems or applications require heat exchangers to fit within a specified system volume. A heat exchanger assembled from a plurality of geometrically similar or identical unit-cells can, in many cases, be shaped by controlling the arrangement of the unit cells to fit or substantially fit the specified unit volume.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
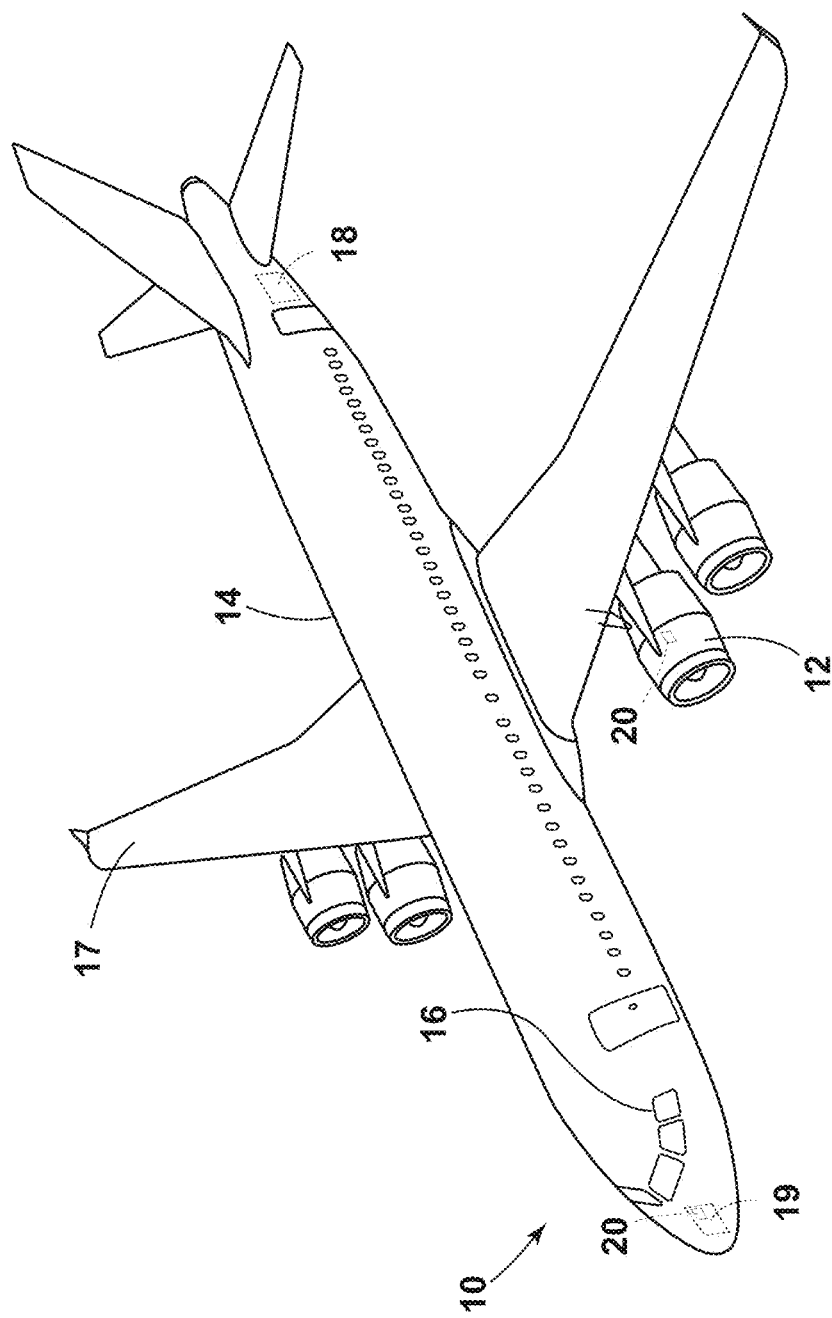
FIG. 1 is a perspective view of an aircraft with at least one engine and including at least one heat exchanger according to an aspect of the disclosure herein.

Aspects of the disclosure herein are directed to a heat exchanger, and more specifically to a heat exchanger having a core formed from a plurality of unit-cells. The heat transfer effectiveness of the core is a function of a relationship between an amount of cooling fluid received on a face of each unit-cell and an amount of hot fluid received at the corners of each unit-cell, or vice versa depending on implementation. For purposes of illustration, the present disclosure will be described with respect to the core defining at least a portion of a heat exchanger that can be located within any suitable part of an aircraft, including but not limited to the engine, avionics systems, or any aircraft system requiring the transfer of heat from one location to another. It will be understood, however, that aspects of the disclosure herein are not so limited and may have general applicability in non-aircraft applications, such as other mobile applications and non-mobile industrial, commercial, and residential applications.

As the heat transfer fluids flow through the heat exchangers, the heat transfer fluids tend to establish a boundary layer which increases thermal resistance and reduces the heat transfer efficiency of the heat exchangers. In addition, the heat transfer efficiency of the heat exchangers is affected by characteristics of the heat exchanger such as material properties, surface areas, flow configurations, pressure drops, and resistivity to thermal exchange. Improving any of these characteristics allows the heat exchanger to have an increased heat transfer efficiency. Moreover, decreasing the weight of the heat exchanger to weigh less than a specified weight improves the efficiency of the engine or other system in which the heat exchanger is operating. However, reducing the size of the heat exchangers to meet system requirements may affect the characteristics that determine heat transfer efficiency.

Also, at least some heat exchangers are not properly shaped to fit within the systems, which results in ineffective use of space and/or wasted volume. Moreover, at least some known heat exchangers are formed to meet system requirements using fabrication techniques that require multiple joints, such as brazed and welded joints. Such joints may deteriorate over time, thereby decreasing a service life of the heat exchangers.

Reference will now be made in detail to the cooling architecture, and in particular the unit-cell defining at least a portion of the heat exchanger, one or more examples of which are illustrated in the accompanying drawings. The detailed description uses numerical and letter designations to refer to features in the drawings.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" can be used interchangeably to distinguish one component from another and are not intended to signify location or importance of the individual components.

As may be used herein, the terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As may be used herein, the terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As may be used herein, the term "fluid" can be a gas or a liquid and the term "fluid communication" means that a fluid is capable of making the connection between the areas specified.

As used herein, the singular forms "a", "an", and "the" include plural references unless the context clearly dictates otherwise.

As may be used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

"Cooling Fluid" (denoted "Fc") as used herein is any type of coolant used for cooling in a heat exchanger. The cooling fluid (Fc) can be fuel, liquid coolant, or bleed air, to list a few general examples.

"Diameter" as used herein is in reference to a hydraulic diameter of the openings within the unit-cell. Hydraulic diameter is a commonly used term when handling flow in non-circular tubes and channels. When the cross-section is uniform along the tube or channel length, it is defined as $$D_H = \frac{4a}{p}$$

where "a" is the cross-sectional area of the flow tube or channel, and "p" is the wetted perimeter of the cross-section.

Figure 6:
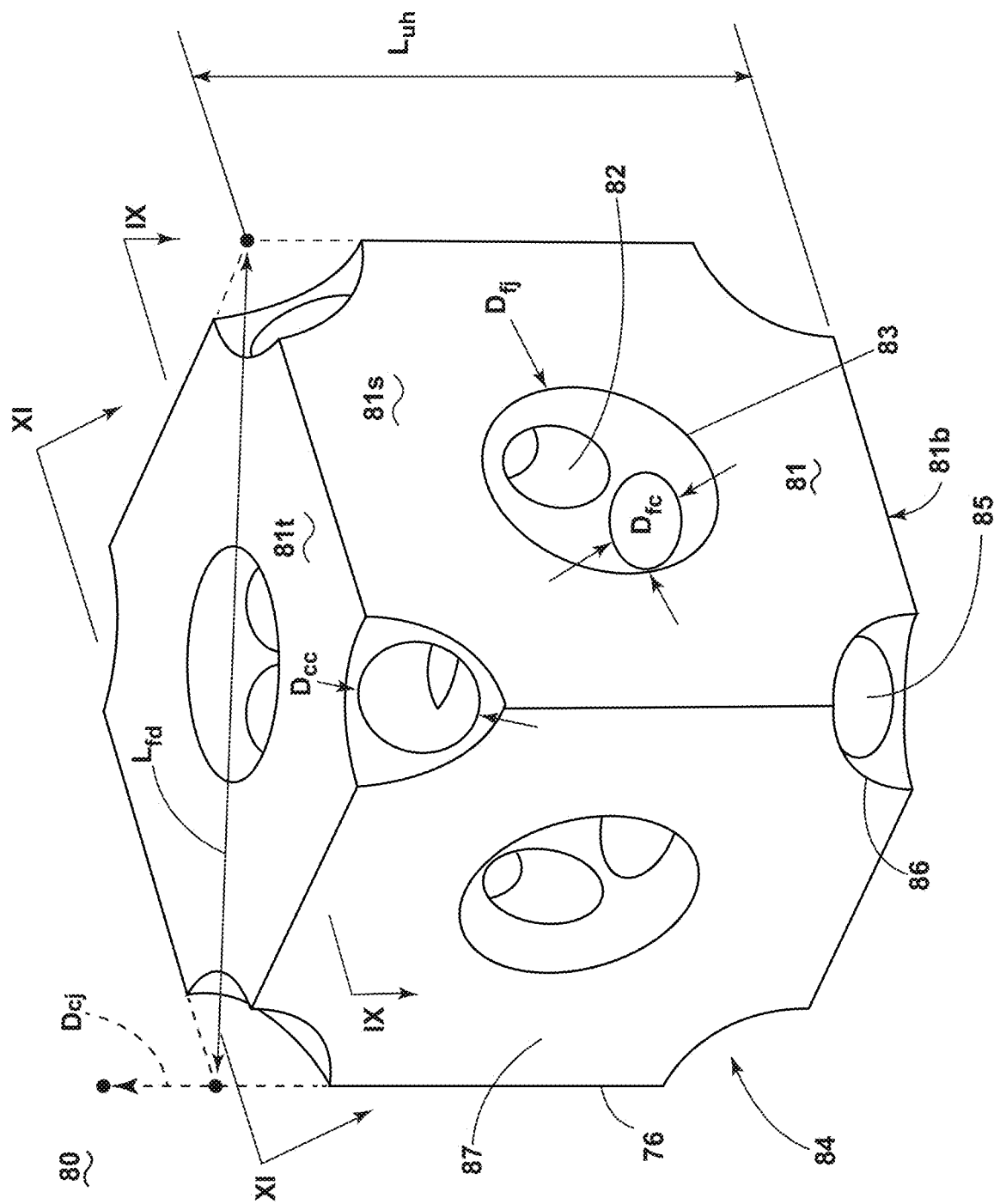
FIG. 6 is an enlarged isometric view of a single unit-cell from FIG. 5.
Figure 13:
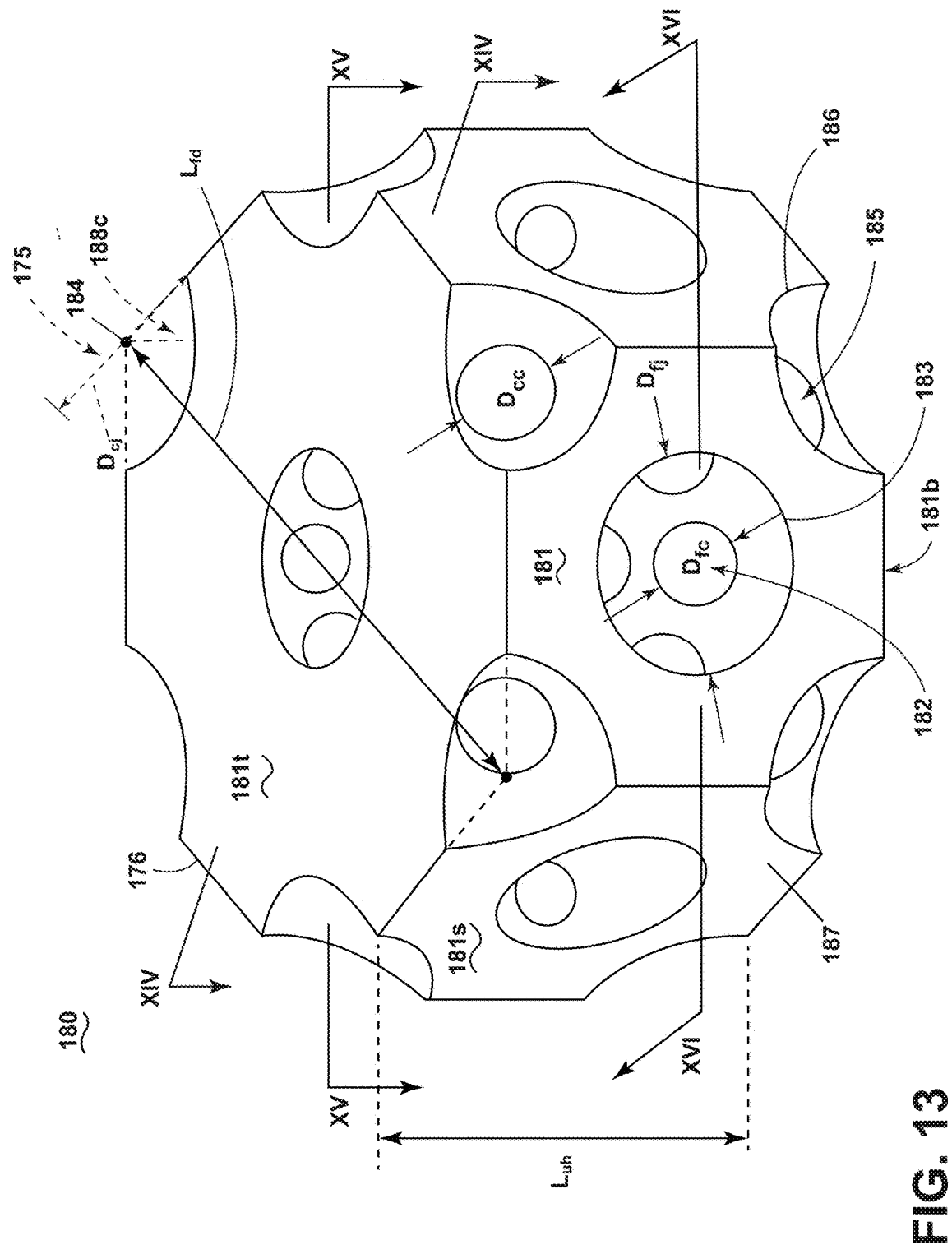
FIG. 13 is an enlarged isometric view of a single unit-cell according to another aspect of the disclosure herein.

"Unit-cell" as used herein is a block with channels connected by openings and formed from walls. Each unit-cell has multiple surfaces, referred to herein as "faces". Each face has a defined number of dominant edges/sides, referred to herein as "face edges". "Corners" as used herein refers to the points at which two or more faces intersect. At least two fluidly separate channels run through the unit-cell, a corner channel extends between the corners and has a corner channel diameter (denoted "$D_{cc}$"). A face channel extends between the faces and has a face channel diameter (denoted "$D_{fc}$"). Where two unit-cells meet at their respective faces, the face channels fluidly connect at a junction, referred to herein as a "face junction" having a face junction diameter (denoted "$D_{fj}$") that is greater than the face channel diameter ($D_{fc}$). Likewise, where two or more unit-cells meet at their respective corners, the corner channels fluidly connect at another junction, referred to herein as a "corner junction" having a corner junction diameter (denoted "$D_{cj}$") that is greater than the corner channel diameter ($D_{cc}$). FIG. 6 and FIG. 13 are both representative illustrations of a unit-cell.

A ratio of the size of face channel diameters vs corner channel diameters ($D_{fc}/D_{cc}$) describes the amount of cooling fluid (Fc) within the unit-cell. For example, a higher ratio would equate with more cooling fluid (Fc) capacity in the face channels than the corner channels and vice versa.

A ratio of the size of face junction diameters vs corner junction diameters ($D_{fj}/D_{cj}$) describes the amount of cooling fluid (Fc) that can be distributed within a unit-cell or to adjacent unit-cells. For example, a higher ratio would equate with more cooling fluid (Fc) capacity at the face junctions than the corner junctions and vice versa.

As used herein, a unit-cell height (denoted "$L_{uh}$") is a length measured along an edge of the unit-cell between two adjacent faces with the largest number of face edges.

As used herein, a face diagonal (denoted "$L_{fd}$") is a maximum length measured between two non-adjacent corners along a line parallel to the face with the largest number of face edges of the unit-cell and through a center of a face of the unit-cell.

As used herein, a unit-cell diagonal (denoted "$L_{ud}$") is a maximum length measured through a center within the unit-cell from a first corner of the unit-cell to a second corner of the unit-cell opposite the first corner. $L_{uh}$, $L_{fd}$, and $L_{ud}$ are related by the Pythagorean theorem: $L_{ud} = \sqrt{L_{uh}^2 + L_{fd}^2}$ A ratio of the value of the unit-cell diagonal vs the face diagonal ($L_{ud}/L_{fd}$) measurement describes the geometry of the unit-cell. For example, a higher ratio would equate with tall/slim unit-cell while a low ratio would equate with a short/wide unit-cell.

As used herein, a number of face channels (denoted "$N_{fc}$") is the number of channels within a unit-cell that connect a pair of face openings on separate surfaces of the unit-cell. For example, a maximum number of face channels for a unit-cell with a cube shape or four face edges is 12.

As used herein a number of corner channels (denoted "$N_{cc}$") is the number of channels extending from a corner opening at the corners of each unit-cell to a distribution chamber or flow junction at the middle of the unit-cell. This middle flow junction is referred to herein as "middle junction", having a middle junction diameter ($D_{mj}$) that is equal or different to the corner junction diameter (Dc'). For example, a maximum number of corner channels for a unit-cell with cube shape or four face edges is 8.

A ratio of the number of face channels vs corner channels ($N_{fc}/N_{cc}$) is equal to 1.5 when all possible channels are present in the unit-cell. For example, a unit-cell in a cube shape having six sides or four face edges, has 12 possible face channels and 8 possible corner channels within, (12/8=1.5).

"USP" as used herein is in reference to a "unit-cell sizing parameter". The USP is a product of the multiple ratios previously described. The USP describes a combined impact from variables associated with the unit-cell. An optimal range exists where the combined impact from the ratios represents a unit-cell for a heat exchanger core that balances the factors associated with the unit-cell. The USP, by combining these effects, enables an assessment of trade-off impacts for heat transfer surface area, pressure drop, and compact when sizing a unit-cell heat exchanger for a given set of operating conditions and requirements.

"Core" as used herein is a plurality of unit-cells within a heat exchanger.

"High" and "Low" as used herein are descriptors with regards to the performance indicator quantities described herein.

"Heat transfer" as used herein is an amount of energy in the form of heat that moves between at least two mediums.

During operation of a gas turbine engine, various systems may generate a relatively large amount of heat. For example, a substantial amount of heat may be generated during operation of the thrust generating systems, lubrication systems, electric motors and/or generators, hydraulic systems or other systems. Accordingly, a heat exchanger within or coupled to the engine is advantageous. Engine performance is directly related to weight and efficiency. Including a compact heat exchanger with a small weight and a high efficiency can enhance the engine's performance. Balancing the weight of heat exchanger with the performance of the heat exchanger for the most desirable engine performance is a time-intensive process.

The heat exchanger can be modified and customized for various operating conditions of the aircraft, including start-up, steady-state, and maximum power. An objective for optimizing a heat exchanger can generally be stated as satisfying a required heat transfer capability from a relatively warmer fluid to a relatively cooler fluid for an acceptable amount of pressure drop across the heat exchanger. Key factors to consider include the available volume and associated geometrical constraints for the unit-cell, the maximum pressure that the unit-cell walls must withstand, and the operational limits associated with the system or component where the heat exchanger is provided.

The inventor's practice has proceeded in the manner of designing a heat exchanger in an aircraft engine. The heat exchanger being defined by a core formed from a collection of unit-cells. During the process, the unit-cells are modified to define the core of the heat exchanger, which in turn is tested in the engine. Testing is done on the engine with the heat exchanger and results are reviewed for meeting heat load requirements. The process continues through redesigning the heat exchanger, in particular any of the unit-cell factors previously described, if needed, to meet cooling requirements, then checking the heat transfer performance again. This process can continue for long periods of time until a workable heat exchanger design is identified. The above-described iterative process is then repeated for the design of several different implementations for the heat exchanger, such as those shown in the following figures. In other words, a heat exchanger design can meet the heat transfer performance requirements for one location in the engine, but not necessarily for another location in the aircraft. Examples of the heat exchanger and unit-cell configurations developed by the inventor follows.

FIG. 1 is a perspective view of an aircraft 10. The aircraft includes a gas turbine engine 12. The aircraft further includes a fuselage 14, a cockpit 16 positioned in the fuselage 14, and wing assemblies 17 extending outward from the fuselage 14. A heat exchanger 20 can be provided in any suitable location in the aircraft 10. For example, the heat exchanger 20 is provided in the gas turbine engine 12 for cooling various parts in the gas turbine engine 12. Other systems in the aircraft 10 including an auxiliary power unit (APU) system 18 and an avionics system 19 can include the heat exchanger 20. It should be understood that any component or system in the aircraft 10 requiring the transfer of heat from one medium to another can be provided with the heat exchanger 20 described herein.

While a commercial aircraft 10 has been illustrated, it is contemplated that the heat exchanger described herein can be used in any type of aircraft 10. Further, while two gas turbine engines 12 have been illustrated on the wing assemblies 17, it will be understood that any number of gas turbine engines 12 including a single gas turbine engine 12 on the wing assemblies 17, or even a single gas turbine engine mounted onto the fuselage 14 is contemplated.

Figure 2:
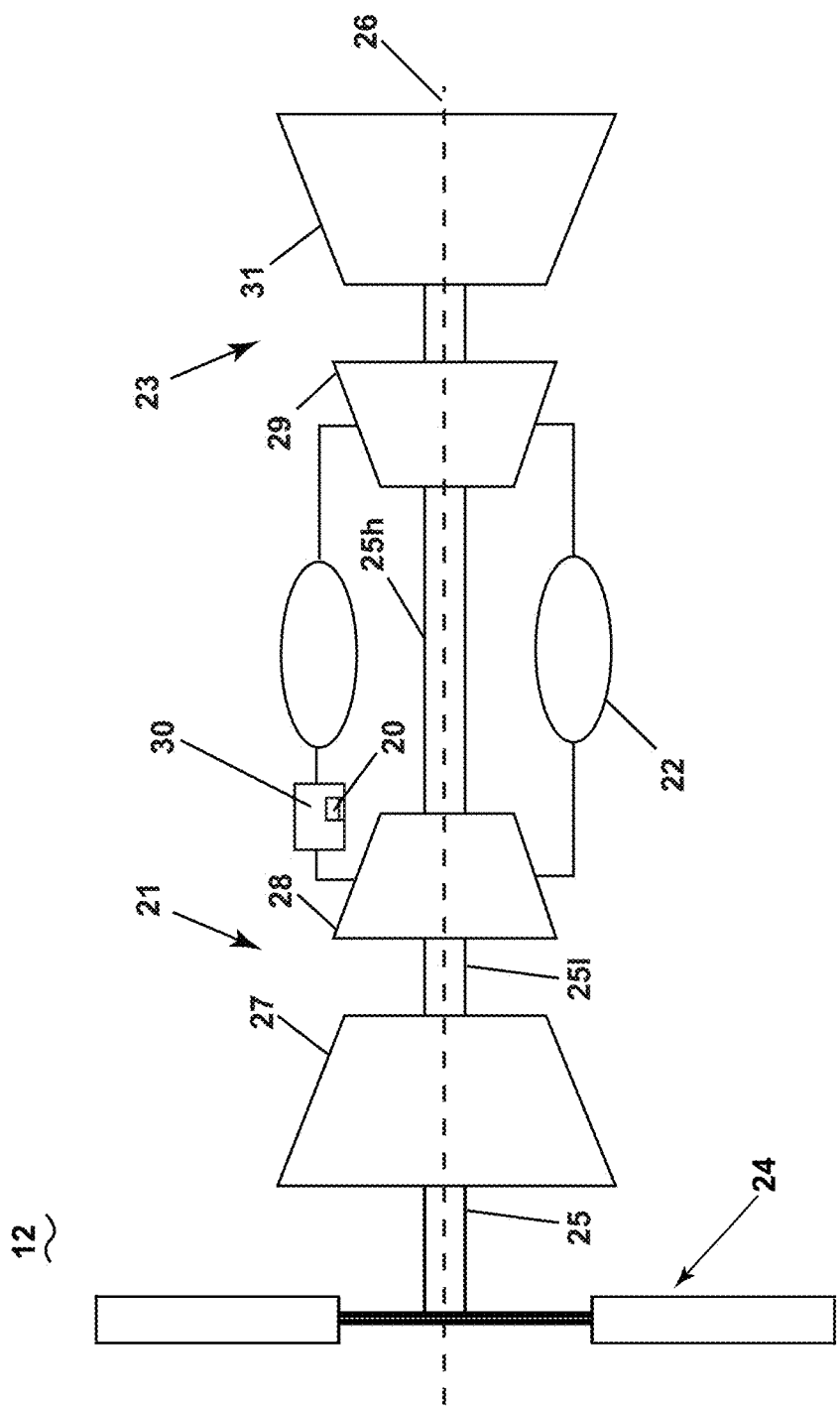
FIG. 2 is a schematic representation of the engine from FIG. 1 including a thermal management system with a heat exchanger.

FIG. 2 is a schematic view of the gas turbine engine 12. The gas turbine engine 12 can include, at least, a compressor 21, a combustor 22, and a turbine 23. A fan 24 can also be provided in the gas turbine engine 12 for providing inlet air to the compressor 21. A drive shaft 25 can rotationally couple the fan 24, compressor 21, and turbine 23, such that rotation of one affects the rotation of the others, and defines a rotational axis or centerline 26 for the gas turbine engine 12.

The compressor 21 includes a low-pressure (LP) compressor 27 and a high-pressure (HP) compressor 28 serially fluidly coupled to one another. The turbine 23 includes an HP turbine 29 and an LP turbine 31 serially fluidly coupled to one another. The drive shaft 25 operatively couples the LP compressor 27, the HP compressor 28, the HP turbine 29 and the LP turbine 31 together. In some implementations, the drive shaft 25 includes an LP drive shaft 25I and an HP drive shaft 25h, where the LP drive shaft 25I couples the LP compressor 27 to the LP turbine 31, and the HP drive shaft 25h couples the HP compressor 28 to the HP turbine 29. An LP spool can be defined as the combination of the LP compressor 27, the LP turbine 31, and the LP drive shaft 25I such that the rotation of the LP turbine 31 applies a driving force to the LP drive shaft 25I, which in turn rotates the LP compressor 27. An HP spool can be defined as the combination of the HP compressor 28, the HP turbine 29, and the HP drive shaft 25h such that the rotation of the HP turbine 29 applies a driving force to the HP drive shaft 25h which in turn rotates the HP compressor 28.

While not illustrated, it will be appreciated that the gas turbine engine 12 can include other components, such as, but not limited to a gearbox. As a non-limiting example, the gearbox can be located at any suitable position within the turbine engine such that it connects one rotating portion to another. As a non-limiting example, the gearbox can connect the fan 24 to the LP drive shaft 25I. The gearbox can allow the fan 24 to run at a different speed than the remainder of the gas turbine engine 12.

The combustor 22 is provided serially between the compressor 21 and the turbine 23. The combustor 22 is fluidly coupled to at least a portion of the compressor 21 and the turbine 23 such that the combustor 22 at least partially fluidly couples the compressor 21 to the turbine 23. As a non-limiting example, the combustor 22 is fluidly coupled to the HP compressor 28 at an upstream end of the combustor 22 and to the HP turbine 29 at a downstream end of the combustor 22.

A thermal management system (TMS) 30 including the heat exchanger 20 is located in the gas turbine engine 12. The TMS 30 provides cooling for different areas of the gas turbine engine 12. During operation of the gas turbine engine 12, ambient or atmospheric air is drawn into the compressor 21 via the fan 24 upstream of the compressor 21, where the air is compressed defining a pressurized air. The pressurized air then flows into the combustor 22 where the pressurized air is mixed with fuel and ignited, thereby generating combustion gases. Some work is extracted from these combustion gases by the HP turbine 29, which drives the HP compressor 28. The combustion gases are discharged into the LP turbine 31, which extracts additional work to drive the LP compressor 27, and the exhaust gas is ultimately discharged from the gas turbine engine 12 via an exhaust section (not illustrated) downstream of the turbine 23. The driving of the LP turbine 31 drives the LP spool to rotate the fan 24 and the LP compressor 27. The pressurized airflow and the combustion gases together define a working airflow that flows through the fan 24, compressor 21, combustor 22, and turbine 23 of the gas turbine engine 12.

Figure 3:
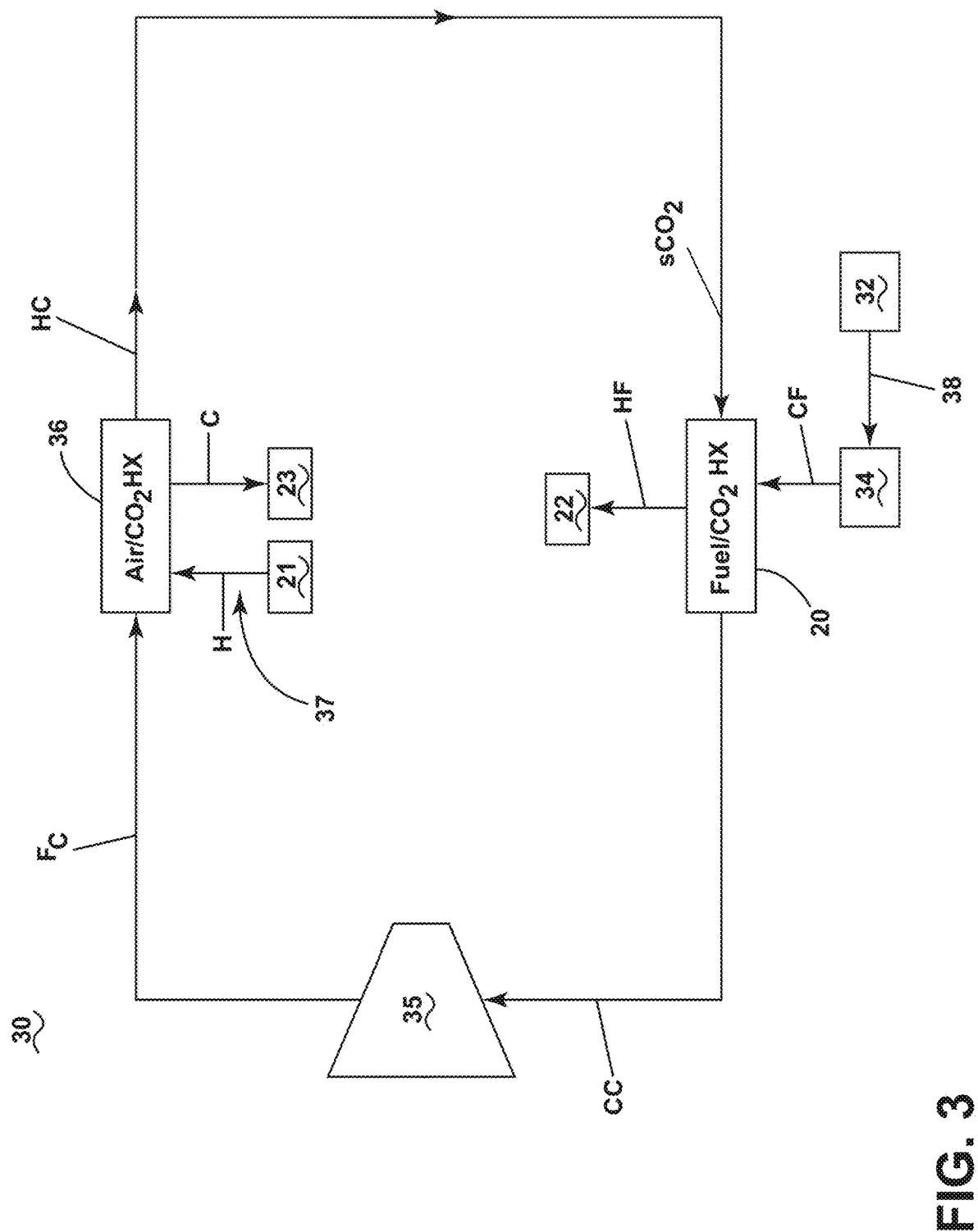
FIG. 3 is a schematic representation of the thermal management system according to one aspect of the disclosure herein.

FIG. 3 is a schematic of the TMS 30 with the heat exchanger 20, a fuel supply 32, a deoxygenation unit 34, a pump 35, and a secondary heat exchanger 36. A cooling fluid (Fc) in the form of super critical carbon dioxide ($sCO_2$) is the working fluid moving through both heat exchangers 20, 36. While super critical carbon dioxide is the working fluid, other cooling fluids are contemplated.

Another cooling fluid (Fc) in the form of fuel 38 is supplied from the fuel supply 32 through the deoxygenation unit 34 and to the heat exchanger 20 as a relatively cold fuel (CF). A heat transfer between the cold fuel (CF) and super critical carbon dioxide ($sCO_2$) in the heat exchanger 20 produces a relatively hot fuel (HF) and a relatively cold carbon dioxide (CC). The hot fuel (HF) is introduced to the combustor 22 for combustion. The cold carbon dioxide (CC) is pumped through the pump 35 and introduced to the secondary heat exchanger 36.

An additional cooling fluid (Fc) in the form of bleed air 37 is introduced to the secondary heat exchanger 36 as a relatively hot air (H) from the compressor 21. A heat transfer between the cold carbon dioxide (CC) and the hot air (H) in the secondary heat exchanger 36 produces a relatively hot carbon dioxide (HC) and a relatively cold air (C). The hot carbon dioxide (HC) returns to the heat exchanger 20 and the cycle continues.

The temperatures of the cooling fluids (Fc) when entering the heat exchangers 20, 36 are relatively "hot" and "cold" with respect to each other. In other words, the bleed air 37 is cooled by the super critical carbon dioxide ($sCO_2$) and the super critical carbon dioxide ($sCO_2$) is cooled by the fuel 38.

Figure 4:
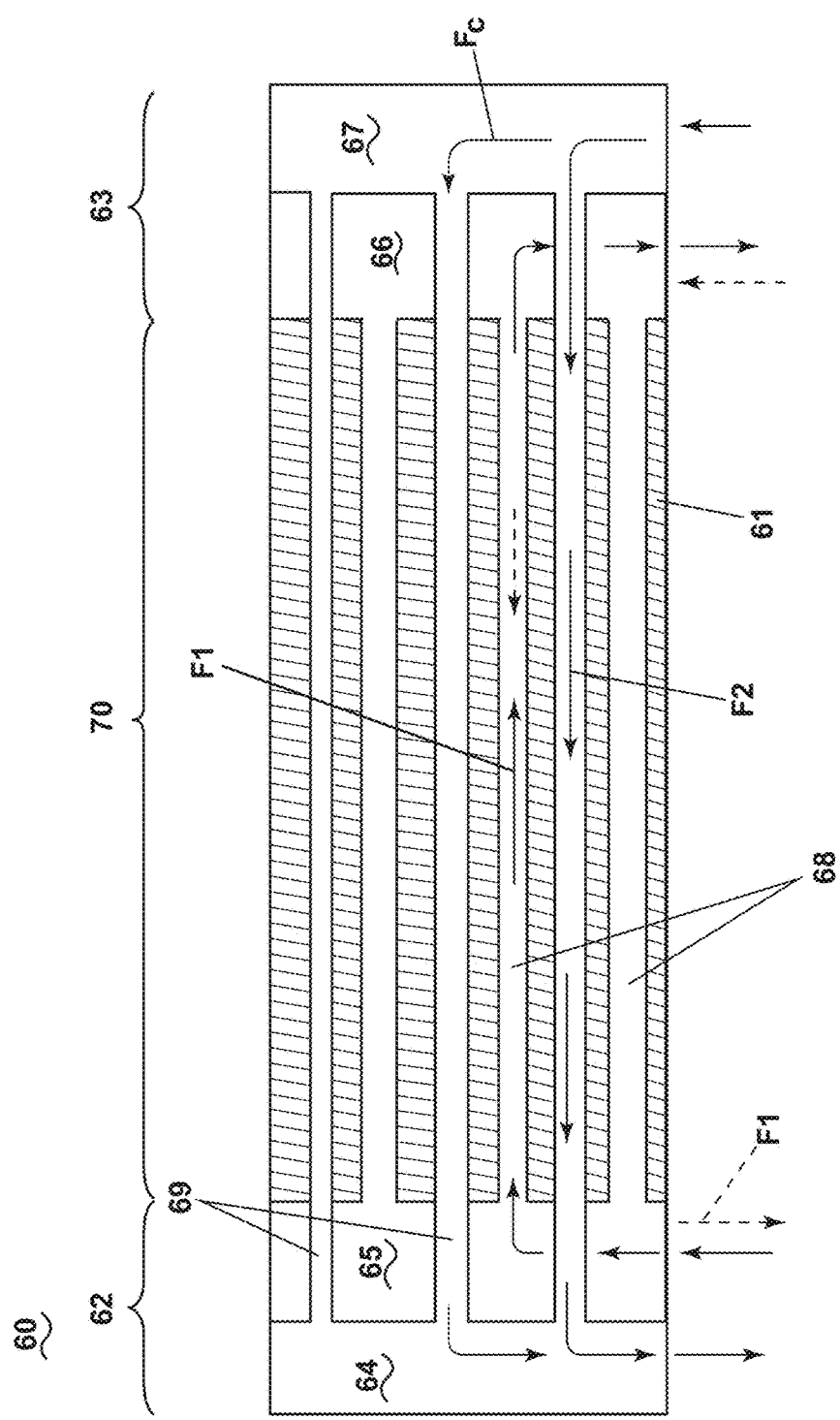
FIG. 4 is a schematic cross-section of a heat exchanger suitable for use in the aircraft of FIG. 1, the engine of FIG. 2, or the thermal management system of FIG. 3, the heat exchanger having a core according to one aspect of the disclosure herein.

FIG. 4 is a schematic cross-section of a heat exchanger 60 according to an aspect of the disclosure herein. It should be understood that the heat exchanger 60 can be either the heat exchanger 20 and/or the secondary heat exchanger 36 as previously described. The heat exchanger 60 includes a core 70 extending between at least two manifolds, a first manifold 62 and a second manifold 63. The first manifold 62 includes a first outlet manifold 64 and a first inlet manifold 65. The second manifold 63 includes a second outlet manifold 66 and a second inlet manifold 67. A first set of channels 68 fluidly couples the first inlet manifold 65 to the second outlet manifold 66. Likewise, a second set of channels 69 fluidly couples the second inlet manifold 67 to the first outlet manifold 64. The first and second set of channels 68, 69 are fluidly separated by a set of walls 61. The first and second set of channels 68, 69 define opposing first and second fluid flow paths (F1, F2) for directing the cooling fluid (Fc). Generally, the first and second fluid flow paths (F1, F2) run in counterflow/opposing directions inside the heat exchanger 60. It should be understood that the inlets and outlets can be interchangeable, in other words the opposing first and second fluid flow paths, F1, F2 can be oriented in the opposite direction as illustrated or in a co-current flow relationship as illustrated in dashed line.

Figure 5:
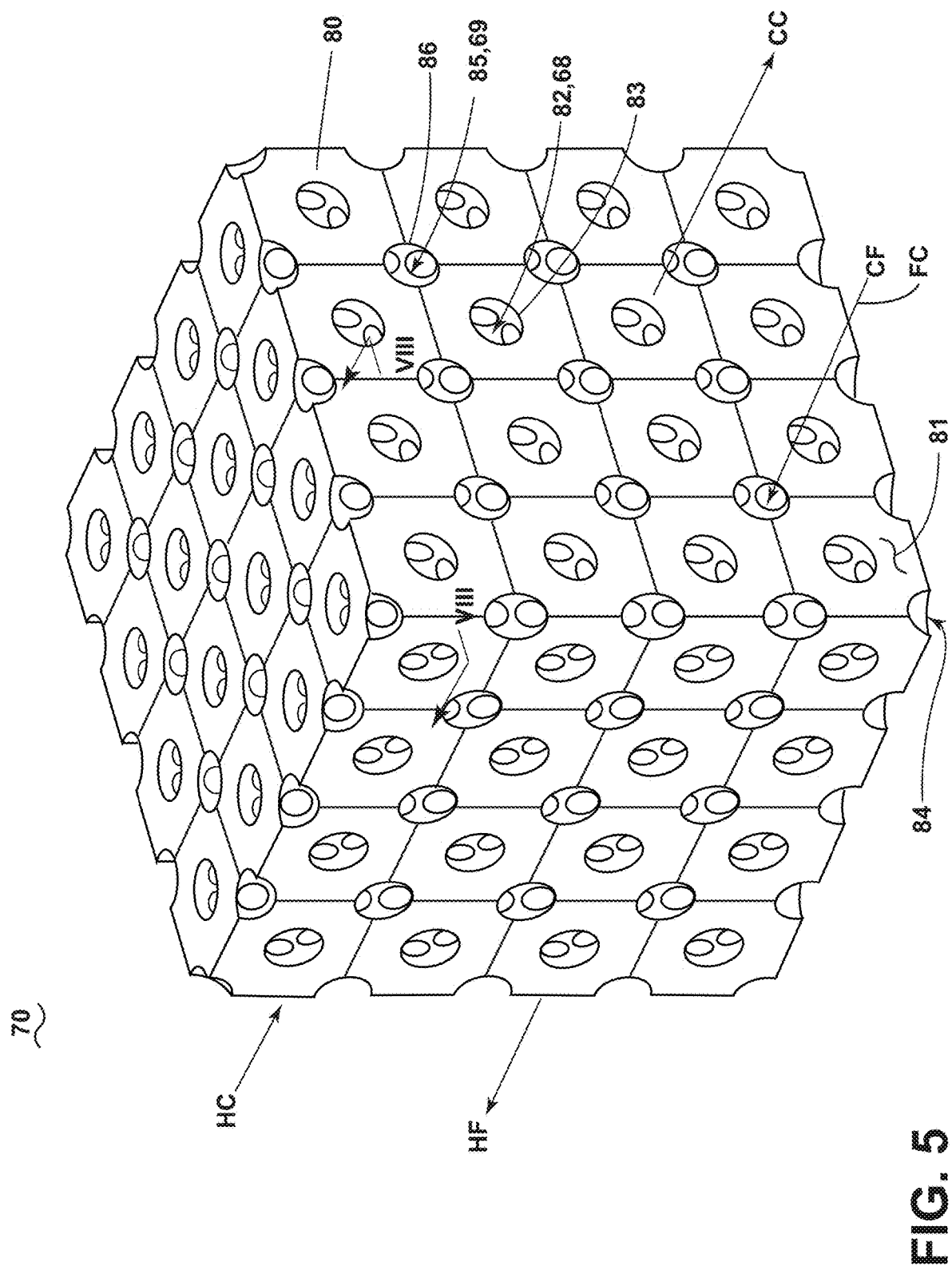
FIG. 5 is an enlarged isometric view of a heat exchanger core suitable for use as the core of FIG. 4 and formed from a plurality of unit-cells according to an aspect of the disclosure herein.

FIG. 5 illustrates the core 70 as a block of sixty-four unit-cells 80. Each unit-cell 80 is in flow communication with adjacent unit-cells 80. A unit-cell 80 includes a plurality of faces 81 and a plurality of corners 84. Each unit-cell 80 defines a set of face channels 82 and a set of corner channels 85. The set of face channels 82 pass through the faces 81 at face openings 83. The set of corner channels 85 pass through the corners 84 at corner openings 86. The set of face channels 82 can define at least a portion of the first set of channels 68 and the set of corner channels 85 can define at least a portion of the second set of channels 69. Cooling fluid (Fc) can pass through the core 70 as previously described where the first and second set of channels 68, 69 are defined by fluidly coupled sequential blocks via the face openings 83 and the corner openings 86. For illustrative purposes the cooling fluid (Fc) can be the cold fuel (CF) as in the heat exchanger 20 of FIG. 3.

FIG. 6 is an isometric view of a single unit-cell 80. The unit-cell 80 is defined by a body 87 having six faces 81, including a top face 81t, a bottom face 81b, and a plurality of side faces 81s, and eight corners 84, with each face having four face edges 76. The face openings 83 define the face junction diameter ($D_{fj}$) and the set of face channels 82 define the face channel diameter ($D_{fc}$). The face junction diameter is greater than or equal to the face channel diameter ($D_{fj} \geq D_{fc}$). The corner openings 86 define at least a portion of the corner junction diameter ($D_{cj}$). It should be understood that when four unit-cells 80 meet, a complete corner junction diameter ($D_{cj}$) is formed. The set of corner channels 85 define the corner channel diameter ($D_{cc}$). The corner junction diameter ($D_{cj}$) is greater than or equal to the corner channel diameter ($D_{cj} \geq D_{cc}$). Additionally, the unit-cell height ($L_{uh}$) and face diagonal ($L_{fd}$) are indicated. Materials used to form the body 87 of the unit-cell 80 can include, but are not limited to, steel, refractory metals such as titanium, or superalloys based on nickel, cobalt, or iron, and ceramic matrix composites. The unit-cell 80 can be formed by a variety of methods, including, casting, electroforming, or additive manufacturing modalities such as direct metal laser melting, in non-limiting examples.

Figure 7:
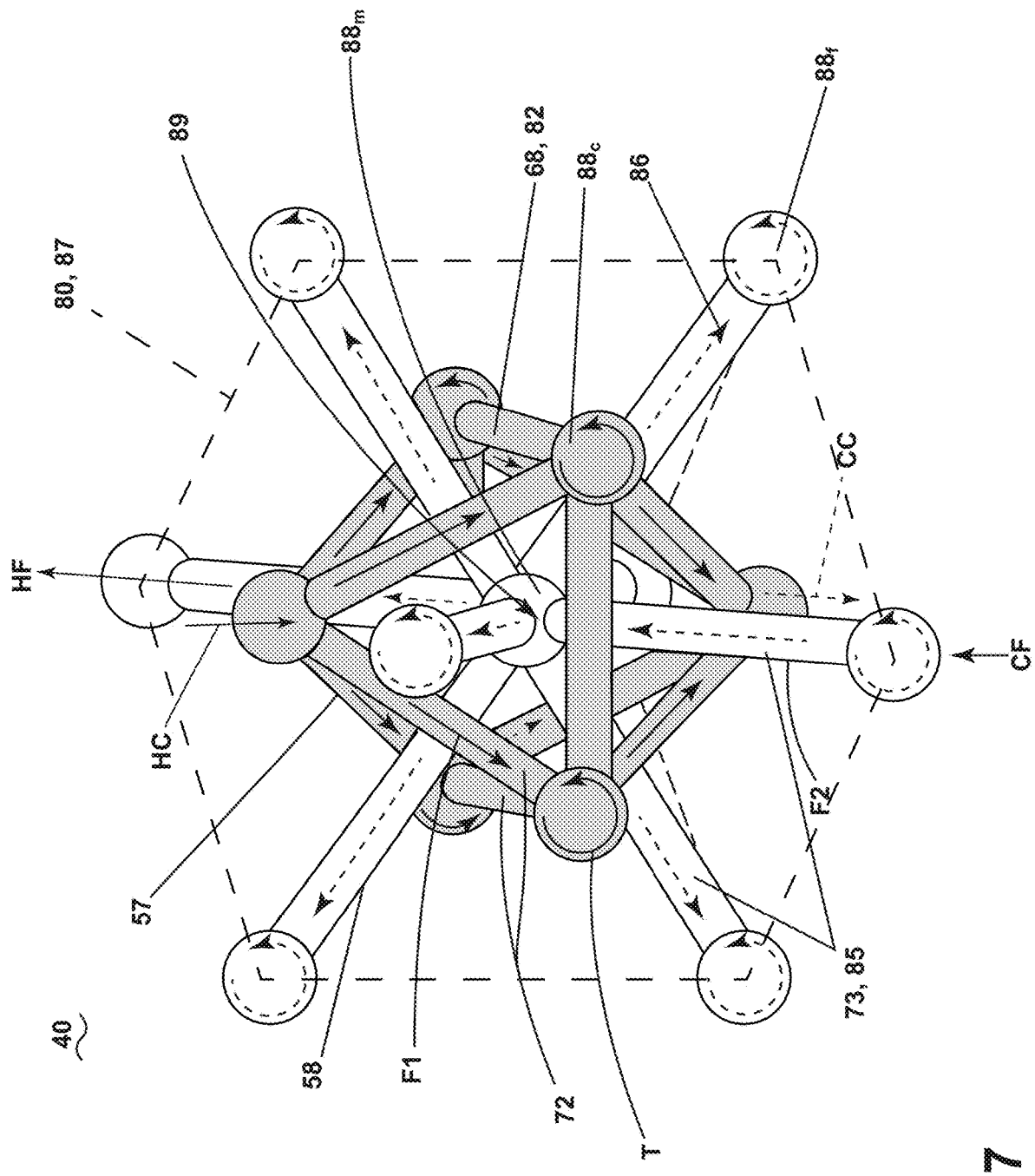
FIG. 7 is a schematic view of a network of channels in the single unit-cell from FIG. 6.

Turning to FIG. 7, the body 87 of the unit-cell 80, in dashed line, has been removed to illustrate only the first and second fluid flow paths (F1, F2). It can more clearly be seen that the first fluid flow path (F1) is a first three-dimensional flow matrix 57 surrounding a center 89 and the second fluid flow path (F2) is a second three-dimensional flow matrix 58 intertwined with and fluidly separate from the first fluid flow path (F1) to form a three-dimensional interlocking mesh 40. It should be understood that the three-dimensional interlocking mesh 40 can repeat and connect to form a larger interlocking mesh as in FIG. 5. Each of the first and second fluid flow paths (F1, F2) can travel into and out of the page as well as up and down with respect to the page. Generally, the first and second fluid flow paths (F1, F2) run in crossflow directions, or generally perpendicular to each other within each unit-cell 80, as illustrated.

Each unit-cell 80 includes multiple face channels 82 defining a first group of multiple branches 72 in the first set of channels 68. Likewise, each unit-cell 80 includes multiple corner channels 85 defining a second group of multiple branches 73 in the second set of channels 69. The multiple branches 72, 73 enable localized turbulence (denoted "T") at flow junctions: a face distribution chamber 88f of the first fluid flow path (F1) and a corner distribution chamber 88c and a middle distribution chamber 88m of the second fluid flow path (F2), which in turn enhances the heat transfer between the cooling fluids (Fc).

Figure 8:
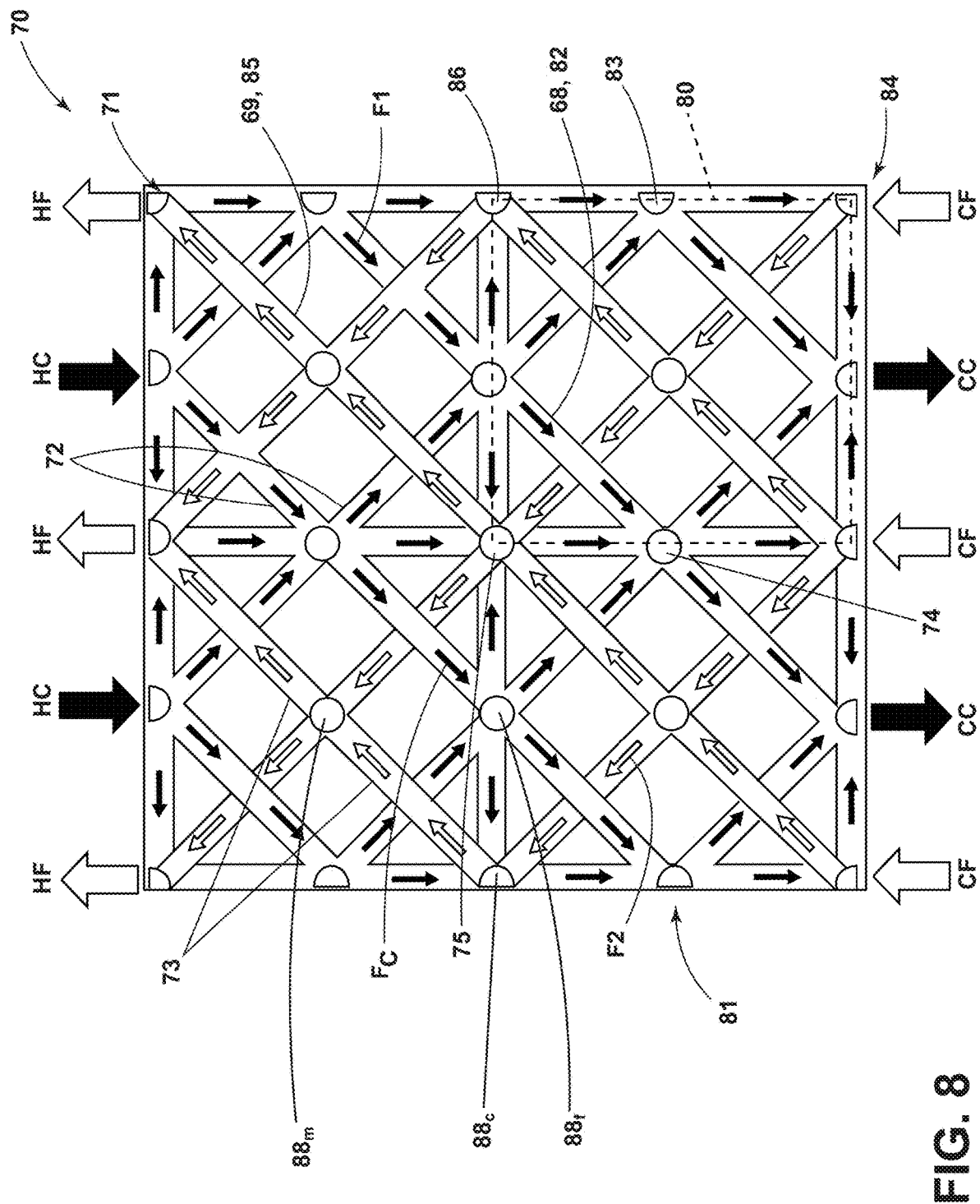
FIG. 8 is a cross-section of a portion of the core from FIG. 5 taken along line VIII-VIII illustrating a network of channels forming two distinct fluid flow circuits.

FIG. 8 illustrates a schematic of a cross-section for the core 70 taken along line VIII-VIII from FIG. 5. The cross-section illustrates four unit-cells 80 with one illustrated in dashed line for clarity. The core 70 defines a network 71 made up of the set of face channels 82 and the set of corner channels 85 to define the first and second sets of channels 68, 69 respectively. Overall, the first and second fluid flow paths, (F1 clear arrows, F2 solid arrows) for channeling the cooling fluid (Fc) run in counterflow directions with respect to the incoming cold fuel (CF) and the outgoing cold carbon dioxide (CC) or the incoming hot carbon dioxide (HC) and the outgoing hot fuel (HF) and run in crossflow direction, or generally perpendicular to each other within each unit-cell, as illustrated.

The first group of multiple branches 72 of the face channels 82 extend from face junctions 74 located where the faces 81 of the unit-cells 80 meet to define a pair of confronting faces 81. The face openings 83 in the pair of confronting faces 81 define the face distribution chamber 88f. The second group of multiple branches 73 of the corner channels 85 extend from corner junctions 75 located where the corners 84 of the unit-cells 80 meet.

Figure 9:
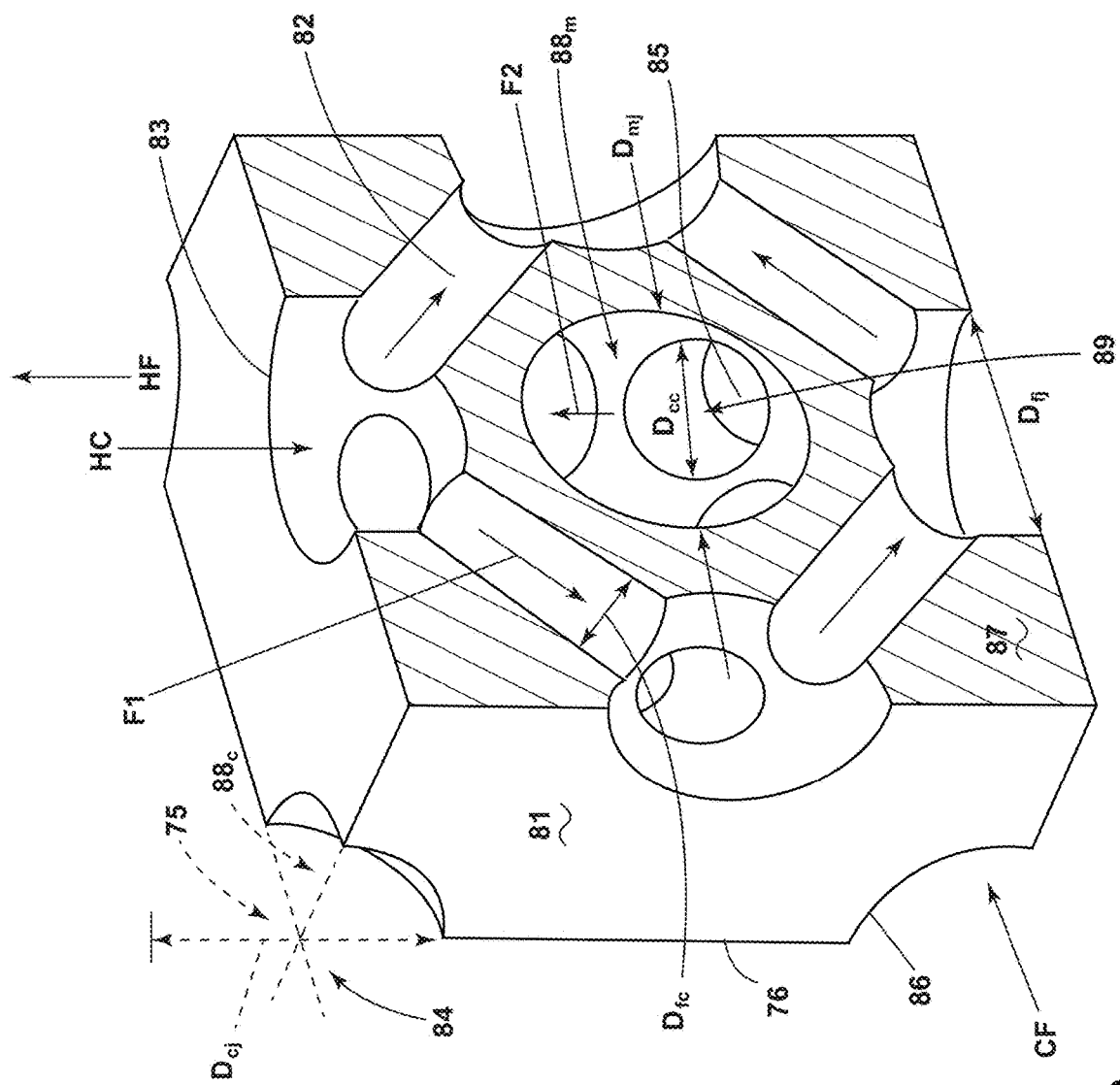
FIG. 9 is a cross-sectional view of the single unit-cell taken along line IX-IX of FIG. 6

FIG. 9 is a cross-section taken along line IX-IX of FIG. 6. The corner openings 86 define the corner junction diameter ($D_{cj}$) at the corner junction 75 as is illustrated in dashed line at one of the corners 84. It should be understood that when four unit-cells 80 abut each other at confronting corners, the four abutting corners form the corner distribution chamber 88c having the corner junction diameter ($D_{cj}$). The middle distribution chamber 88m, having a middle junction diameter ($D_{mj}$) is located in a center 89 of the unit-cell 80 with the same or different diameter as the corner junction diameter ($D_{cj}$). The set of face channels 82 extend next to and fluidly separate from the middle distribution chamber 88m to define the first fluid flow path (F1). The hot carbon dioxide (HC) can flow along the first fluid flow path (F1) defined by the set of face channels 82. Heat exchanged through the body 87 with cold fuel (CF) in the second fluid flow path (F2) produces relatively cooler carbon dioxide (CC) exiting the unit-cell 80.

Figure 10:
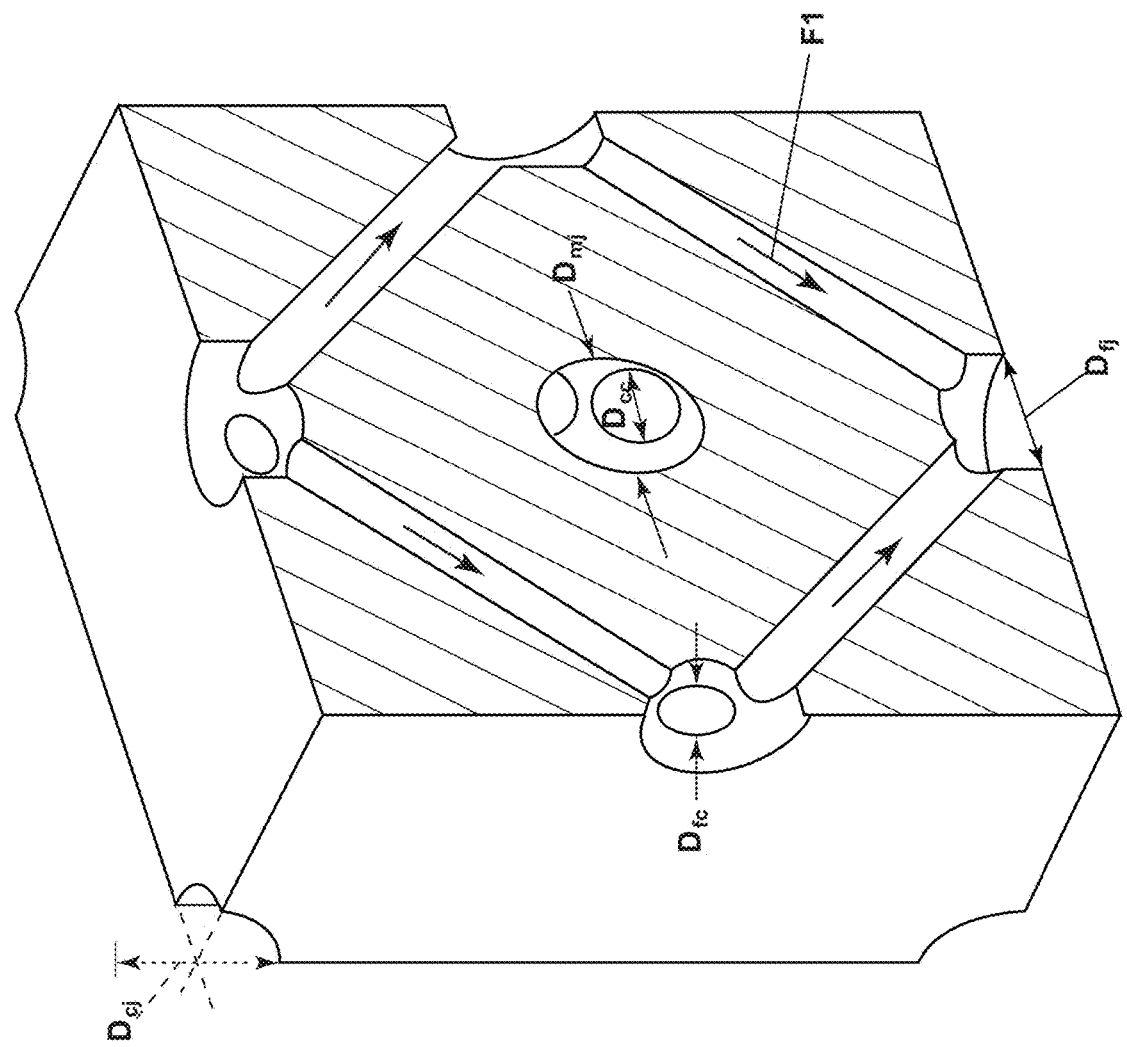
FIG. 10 is a variation of the cross-sectional view from FIG. 9 according to an aspect of the disclosure herein.

FIG. 10 is a variation of the cross-section taken along line IX-IX of FIG. 6 with a smaller size of the face channel diameter ($D_{fc}$) described herein. Further, a smaller sized face junction diameter ($D_{fj}$), corner junction diameter ($D_{cj}$), and middle junction diameter ($D_{mj}$) are also illustrated.

Figure 11:
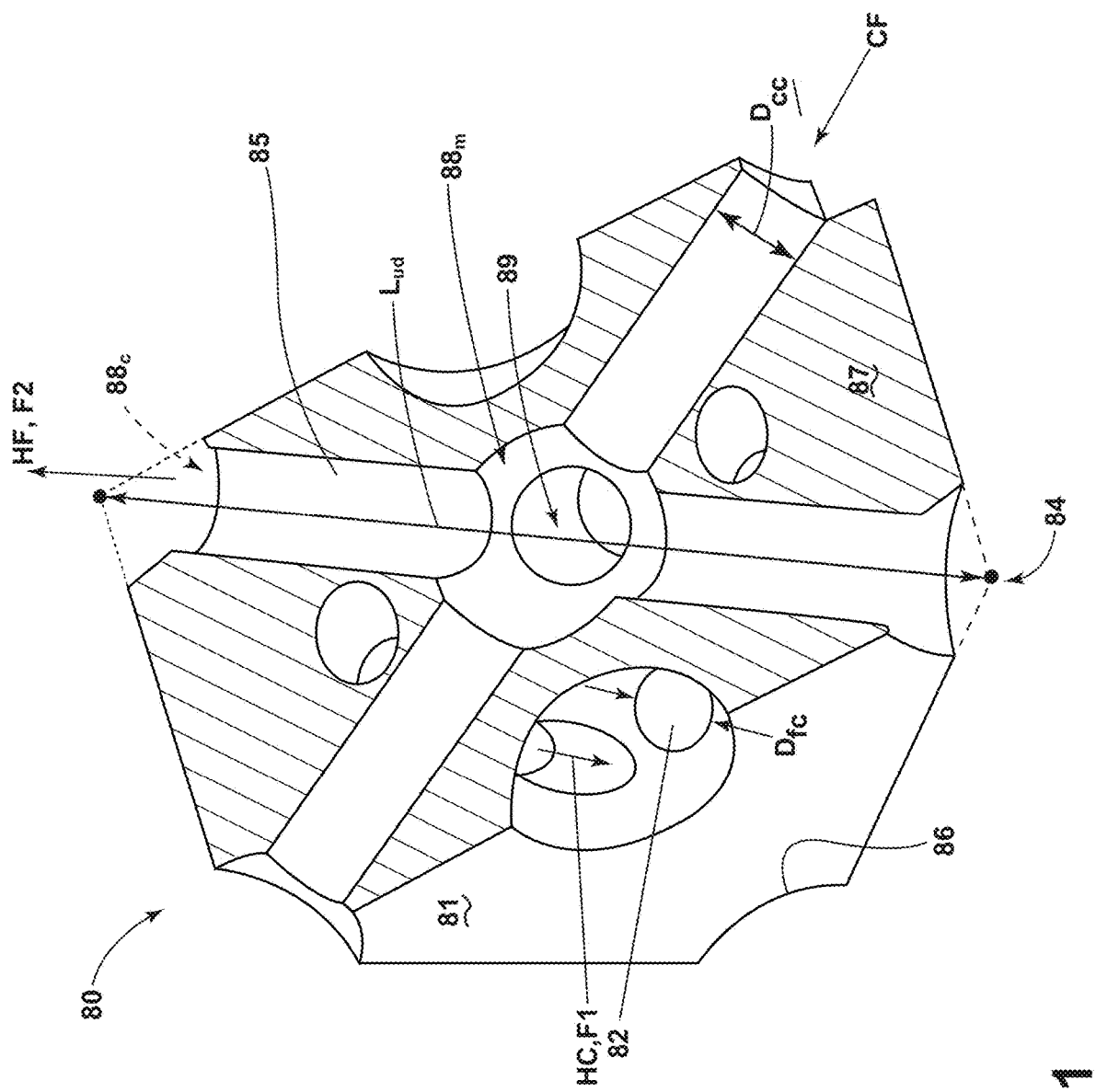
FIG. 11 is a cross-sectional view of the single unit-cell taken along line XI-XI of FIG. 6.

FIG. 11 is a cross-section taken along line XI-XI of FIG. 6. The unit-cell diagonal ($L_{ud}$) is illustrated as measured between opposing corners 84 and passing through the center 89 of the unit-cell 80. Each corner channel 85 in the set of corner channels 85 connects a corner opening 86 with the middle distribution chamber 88m. The unit-cell diagonal ($L_{ud}$) extends along the set of corner channels 85 defining the second fluid flow path (F2). The cold fuel (CF) can flow along the second fluid flow path (F2) as illustrated. Heat exchanged through the body 87 with hot carbon dioxide (HC) in the first fluid flow path (F1) produces relatively warmer fuel (HF) exiting the unit-cell 80.

Figure 12:
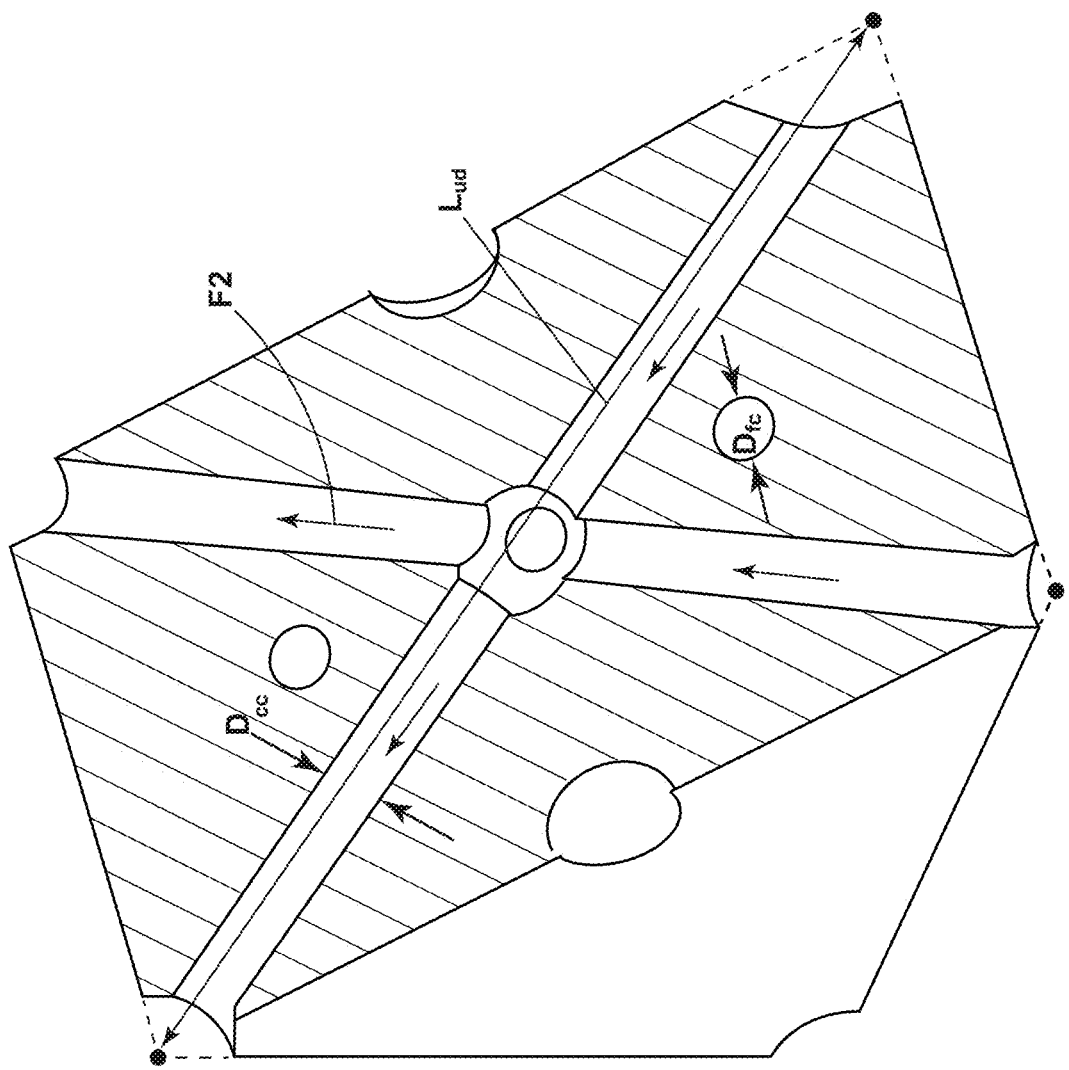
FIG. 12 is a variation of the cross-sectional view from FIG. 11 according to another aspect of the disclosure herein.

FIG. 12 is a variation of the cross-section taken along line XI-XI of FIG. 6 illustrating a smaller size of the corner channel diameter ($D_{cc}$) described herein.

FIG. 13 is an isometric view of a single unit-cell 180 according to another aspect of the disclosure herein. The unit-cell 180 is substantially similar to the unit-cell 80, therefore, like parts will be identified with like numerals increased by 100. It should be understood that the description of the like parts of the unit-cell 80 applies to the unit-cell 180 unless otherwise noted. The unit-cell 180 is defined by a body 187 having eight faces 181 and twelve corners 184. The unit-cell 180 has a top face 181t and a bottom face 181b each with six face edges 176 and six side faces 181s with four face edges. A set of face channels 182 passes through faces 181 to connect face openings 183. A set of corner channels 185 passes through a middle distribution chamber 188m (FIG. 14) located in a center 189 (FIG. 14) of the unit-cell 180 to corners 184. Each of the sets of face and corner channels 182, 185 define the face channel diameter ($D_{fc}$) and the corner channel diameter ($D_{cc}$), respectively. Likewise, each of the face and corner openings 183, 186 define the face junction diameter ($D_{fj}$) and corner junction diameter ($D_{cj}$), respectively. Additionally, FIG. 13 indicates the face diagonal ($L_{fd}$) and the unit-cell height ($L_{uh}$), which spans the distance between the two adjacent faces with the largest number of face edges 176.

Figure 14:
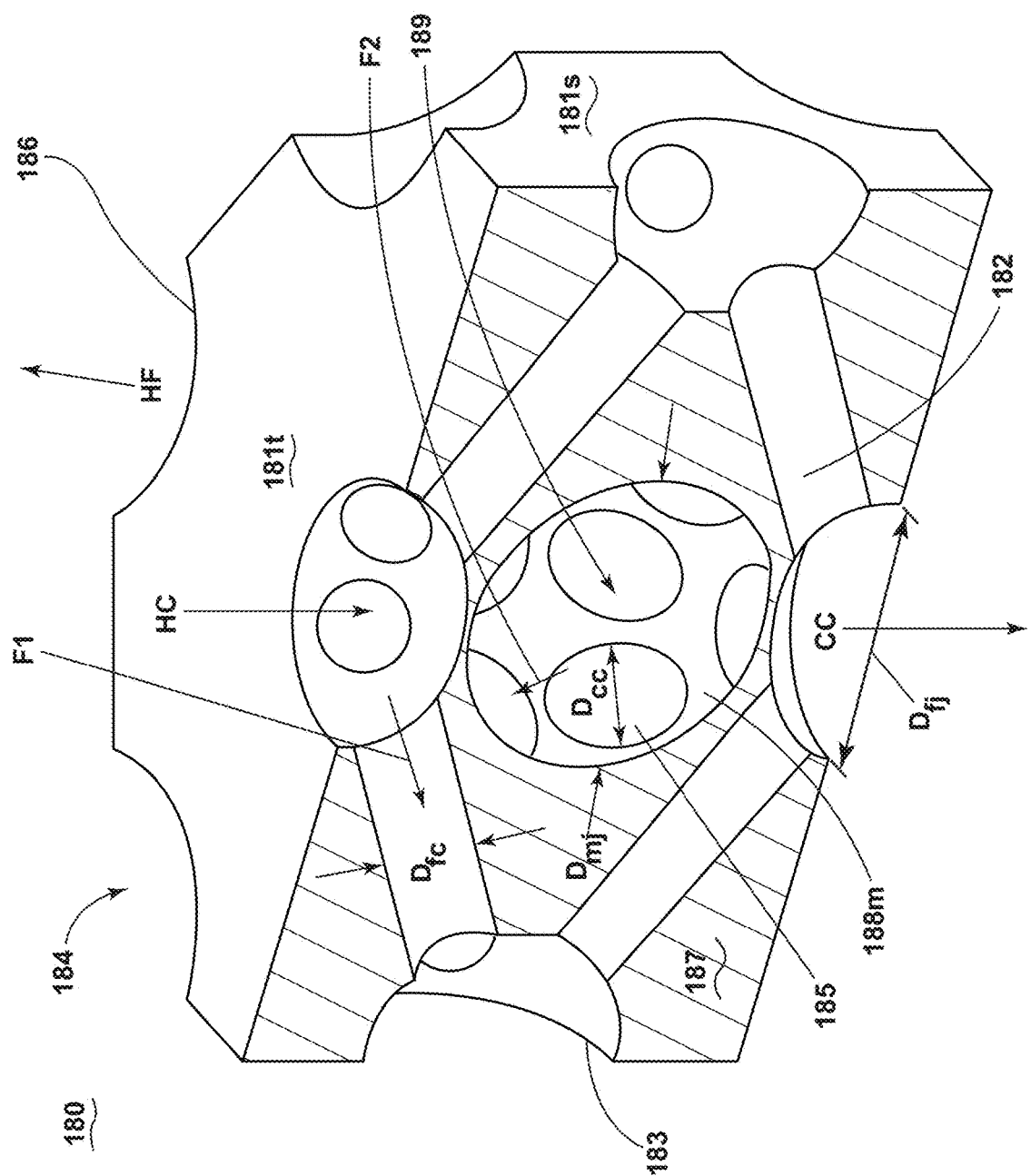
FIG. 14 is a cross-sectional view of the single unit-cell from FIG. 13 taken along line XIV-XIV.

FIG. 14 is a cross-section taken along line XIV-XIV of FIG. 13. The middle distribution chamber 188m is illustrated at the center 189 of the unit-cell 180 having a middle junction diameter ($D_{mj}$). The set of face channels 182 are fluidly separate from and extend next to the middle distribution chamber 188m to connect face openings 183. The set of face channels 182 defines the first fluid flow path (F1). The hot carbon dioxide (HC) can flow along the first fluid flow path (F1) defined by the face channels 182. Heat exchanged through the body 187 with cold fuel (CF) in the second fluid flow path (F2) produces relatively cooler carbon dioxide (CC) exiting the unit-cell 180.

Figure 15:
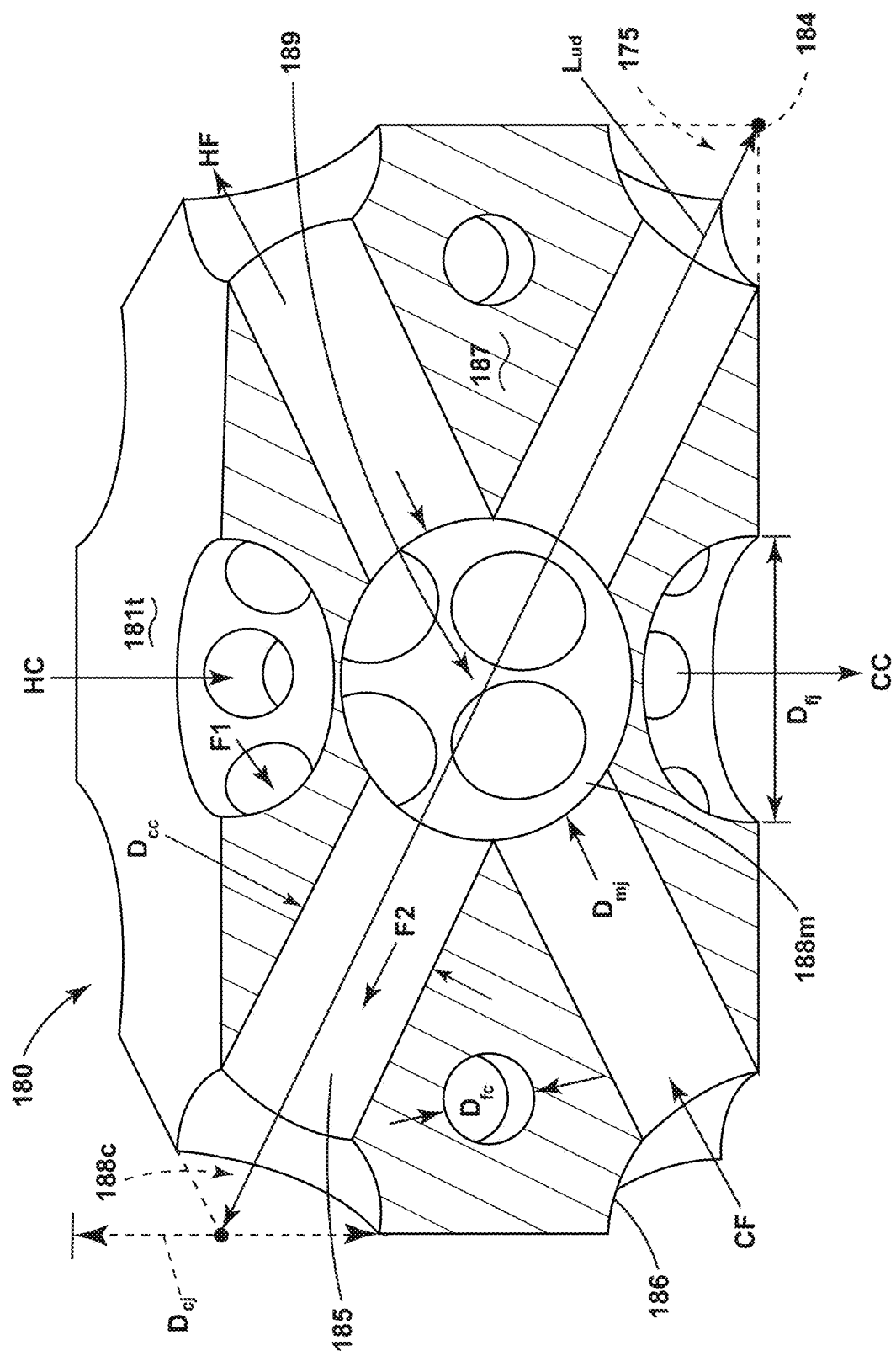
FIG. 15 is a cross-sectional view of the single unit-cell from FIG. 13 taken along line XV-XV.

FIG. 15 is a cross-section taken along line XV-XV of FIG. 13. The unit-cell diagonal ($L_{ud}$) is illustrated as measured between opposing corners 184 and passing through the center 189 of the unit-cell 180. Each corner channel 185 in the set of corner channels 185 connects a corner opening 186 with the middle distribution chamber 188m. The unit-cell diagonal ($L_{ud}$) extends along the set of corner channels 185 defining the second fluid flow path (F2). The cold fuel (CF) can flow along the second fluid flow path (F2) as illustrated. Heat exchanged through the body 187 with hot carbon dioxide (HC) in the first fluid flow path (F1) produces relatively warmer fuel (HF) exiting the unit-cell 180.

Figure 16:
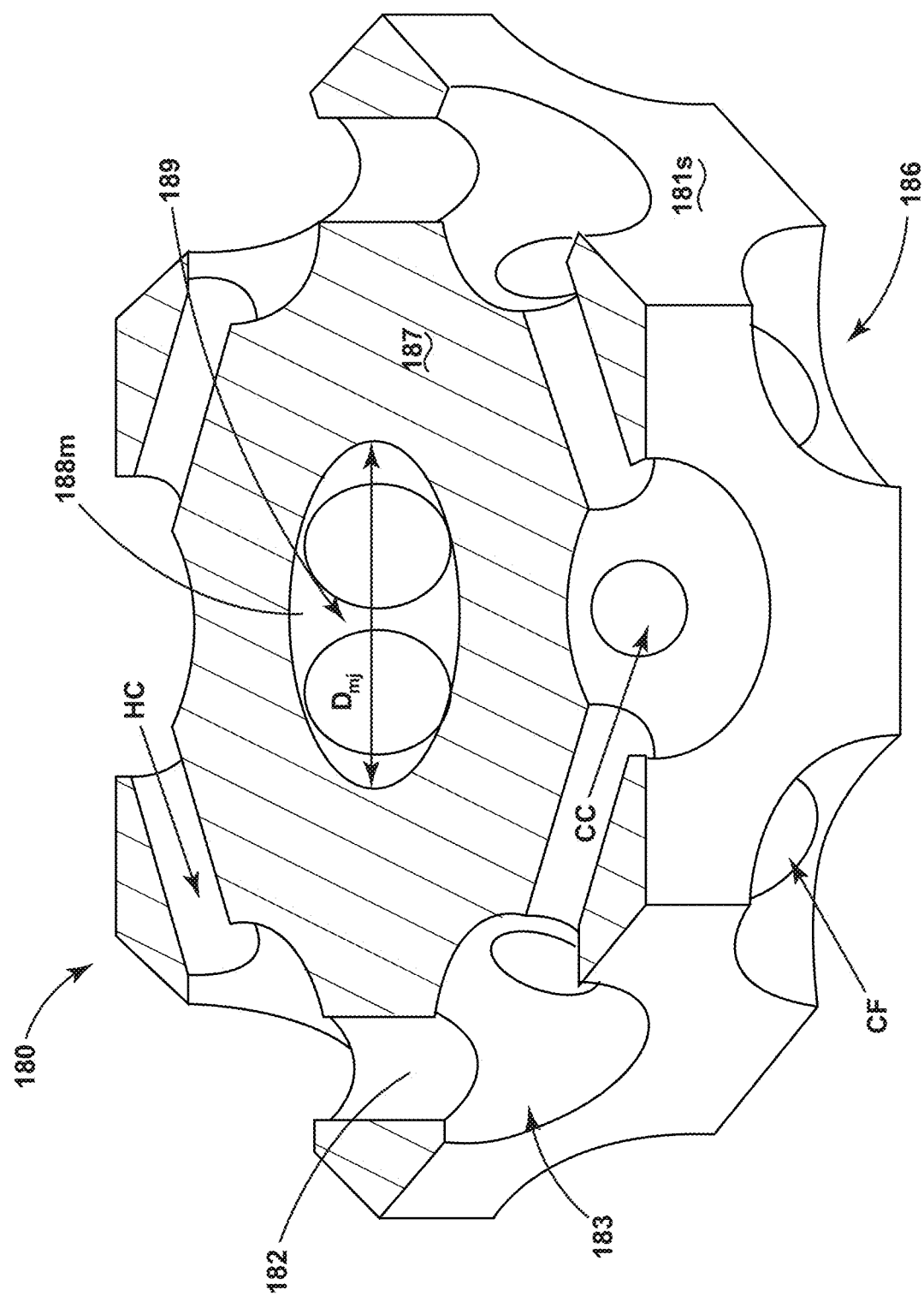
FIG. 16 is a cross-sectional view of the single unit-cell from FIG. 13 taken along line XVI-XVI.

FIG. 16 is a cross-sectional view taken along line XVI-XVI of FIG. 13 Again, the middle junction diameter ($D_{mj}$) is illustrated at the middle distribution chamber 188m of the unit-cell 180 fluidly separate from the face channels 182. It can more clearly be seen that the unit-cell 180 can include a face channel 182 for every pair of face openings 183, six of which are shown in the cross-sectional view.

Figure 17:
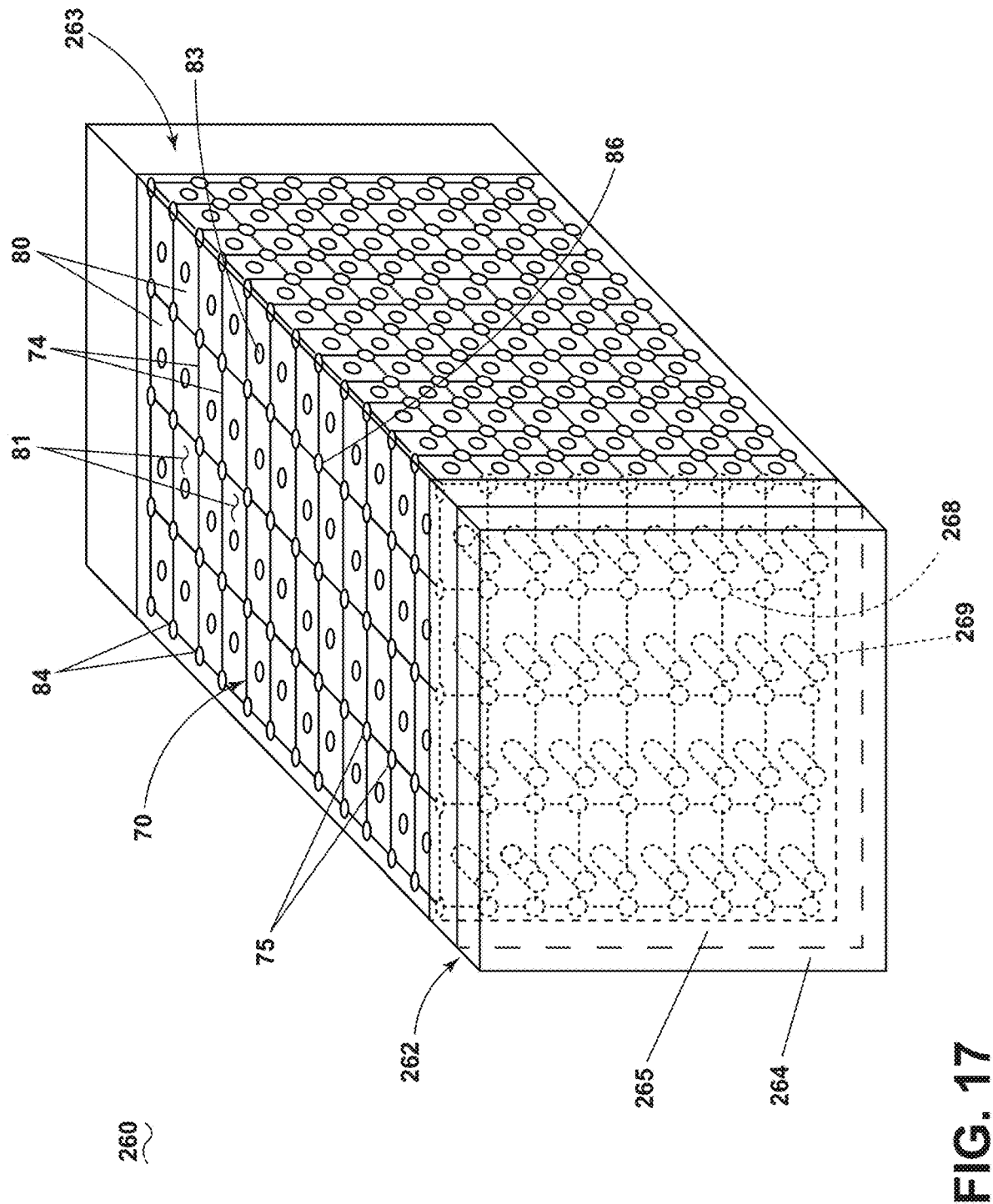
FIG. 17 is an isometric view of a heat exchanger extending between a first and second manifold and having a core defined by a plurality of unit-cells according to another aspect of the disclosure herein.

Turning to FIG. 17, an isometric view of a heat exchanger 260 according to an aspect of the disclosure herein is illustrated. The heat exchanger 260 is substantially similar to the heat exchanger 60, therefore, like parts will be identified with like numerals increased by 200. It should be understood that the description of the like parts of the heat exchanger 60 of FIG. 4 applies to the heat exchanger 260 unless otherwise noted. Further, the heat exchanger 260 includes the core 70 from FIG. 5. It should be understood that the unit-cell 80 can be the unit-cell 80 of FIG. 6 or the unit-cell 180 of FIG. 13. For clarity, numerals will match the numerals of FIG. 6.

A first set of channels 268 is fluidly connected to a first manifold 262 and a second manifold 263. A second set of channels 269 is fluidly separate from the first set of channels 268 and is fluidly connected to the first and the second manifold 262, 263. Each of the first and second manifolds 262, 263 can be partitioned into two manifolds/chambers. The first manifold 262 is illustrated as being separated into a first outlet manifold 264 and a first inlet manifold 265, where the first set of channels 268 is fluidly coupled to the first inlet manifold 265 and the second set of channels 269 is fluidly coupled to the first outlet manifold 264. Similar to the first manifold 262, the second manifold 263 can also be partitioned into two manifolds/chambers to enable separate fluid couplings to the first and second sets of channels 268, 269.

Figure 18:
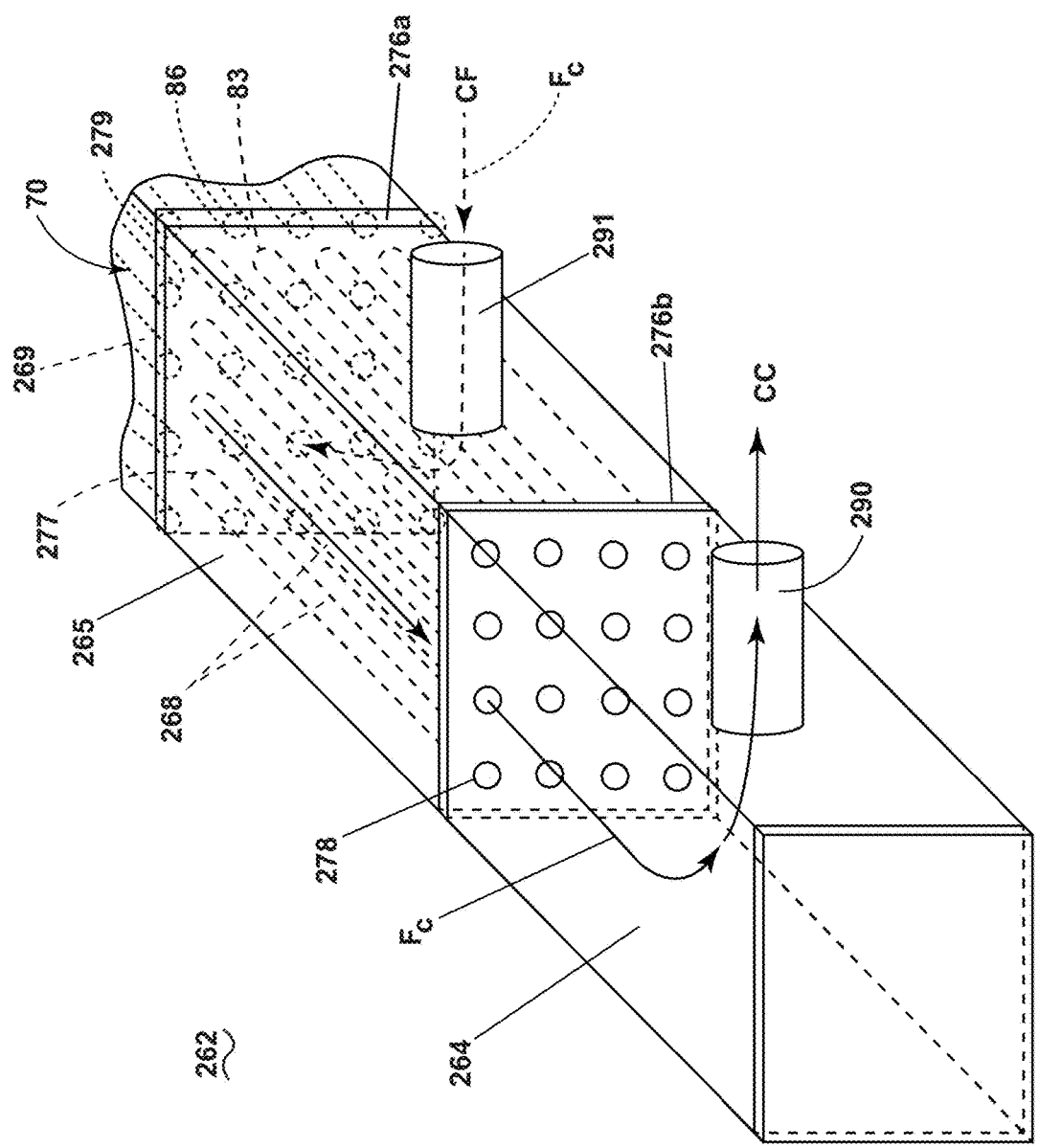
FIG. 18 is an enlarged isometric schematic view of the first manifold from FIG. 17

FIG. 18 is an enlarged schematic isometric view of the first manifold 262. A first partition 276a separates the core 70 from the first inlet manifold 265. A second partition 276b separates the first inlet manifold 265 from the first outlet manifold 264. A first set of openings 277 is provided in the first partition 276a proximate the core 70. The first set of openings 277 aligns with and is fluidly coupled to the face openings 83. A second set of openings 278 is provided in the second partition 276b. The first set of channels 268 can extend between the first set of openings 277 and the second set of openings 278 to define a fluid connection between the core 70 and the first outlet manifold 264.

A third set of openings 279 is also provided in the first partition 276a proximate the core 70. The third set of openings 279 aligns with and is fluidly coupled to the second set of channels 269 at the corner openings 86 to define a fluid connection between the core 70 and the first inlet manifold 265.

The first outlet manifold 264 can be fluidly coupled to a first outlet nozzle 290. The first inlet manifold 265 can be fluidly coupled to a first inlet nozzle 291. By way of non-limiting example, the first inlet manifold 265 can receive a cooling fluid (Fc) in the form of cold fuel (CF) via the first inlet nozzle 291. Further, cooled super critical carbon dioxide ($sCO_2$) can exit the heat exchanger 260 via the first outlet nozzle 290 in the form of cold carbon dioxide (CC).

While the first outlet manifold 264 and the first inlet manifold 265 have been elongated to more clearly illustrate the second set of channels 269 extending through the first inlet manifold 265, it should be understood that any size manifolds and nozzles are contemplated.

Figure 19:
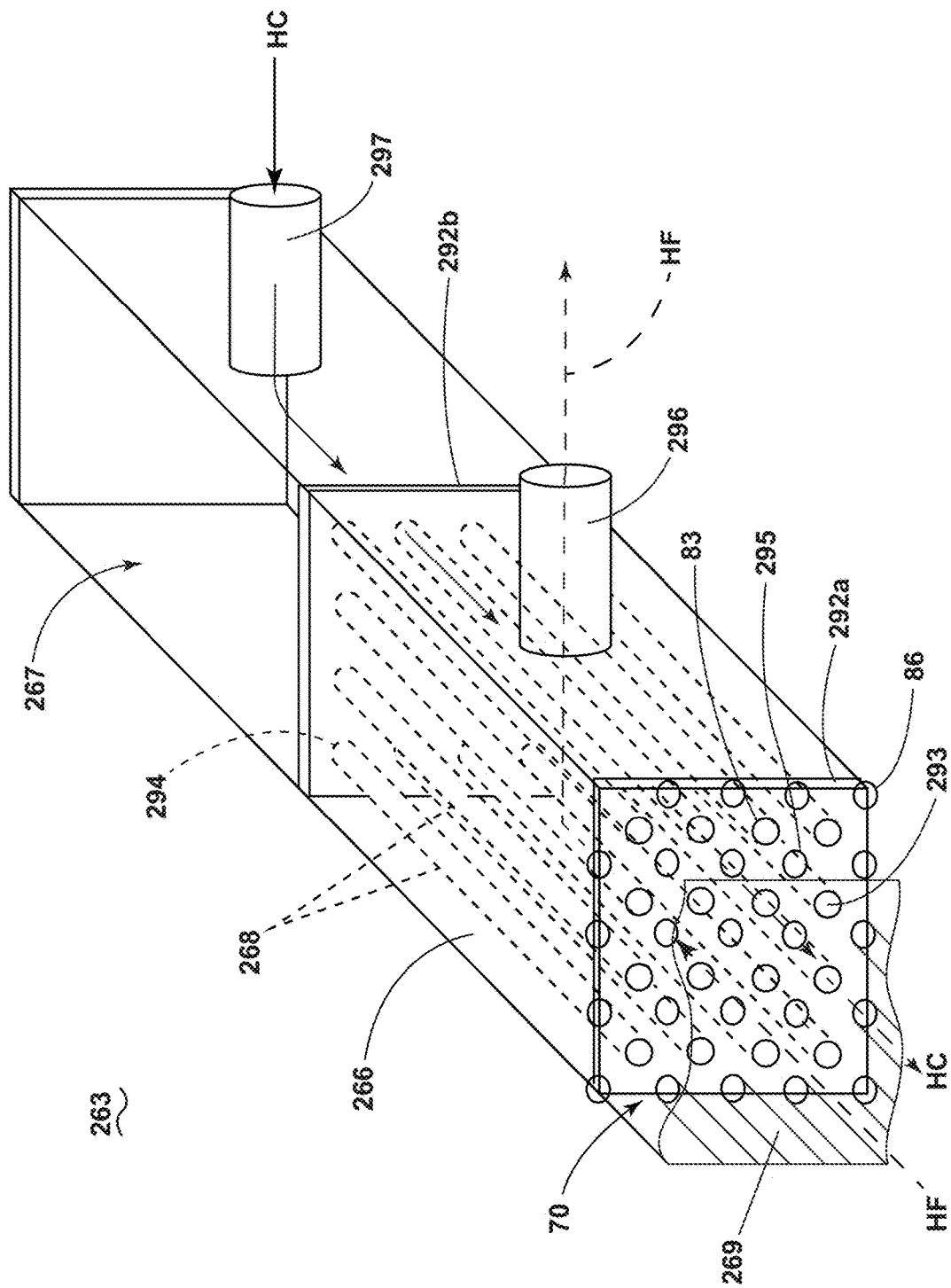
FIG. 19 is an enlarged isometric schematic view of the second manifold from FIG. 17.

FIG. 19 is an isometric view of the second manifold 263. A third partition 292a separates the core 70 from a second outlet manifold 266. A fourth partition 292b separates a second inlet manifold 267 from the second outlet manifold 266. A fourth set of openings 293 is provided in the third partition 292a proximate the core 70. The fourth set of openings 293 aligns with and is fluidly coupled to the face openings 83. A fifth set of openings 294 is provided in the fourth partition 292b. The first set of channels 268 can extend between the fourth set of openings 293 and the fifth set of openings 294 to define a fluid connection between the second inlet manifold 267 and the core 70.

A sixth set of openings 295 is also provided in the third partition 292a proximate the core 70. The sixth set of openings 295 aligns with and is fluidly coupled to the second set of channels 269 at the corner openings 86 to define a fluid connection between the core 70 and the second outlet manifold 266.

The second outlet manifold 266 can be fluidly coupled to a second outlet nozzle 296. The second inlet manifold 267 can be fluidly coupled to a second inlet nozzle 297. By way of non-limiting example, the second inlet manifold 267 can receive hot carbon dioxide (HC) for cooling. Further, the cooling fluid (Fc) can exit the heat exchanger 260 via the second outlet nozzle 296 in the form of hot fuel (HF).

Figure 20:
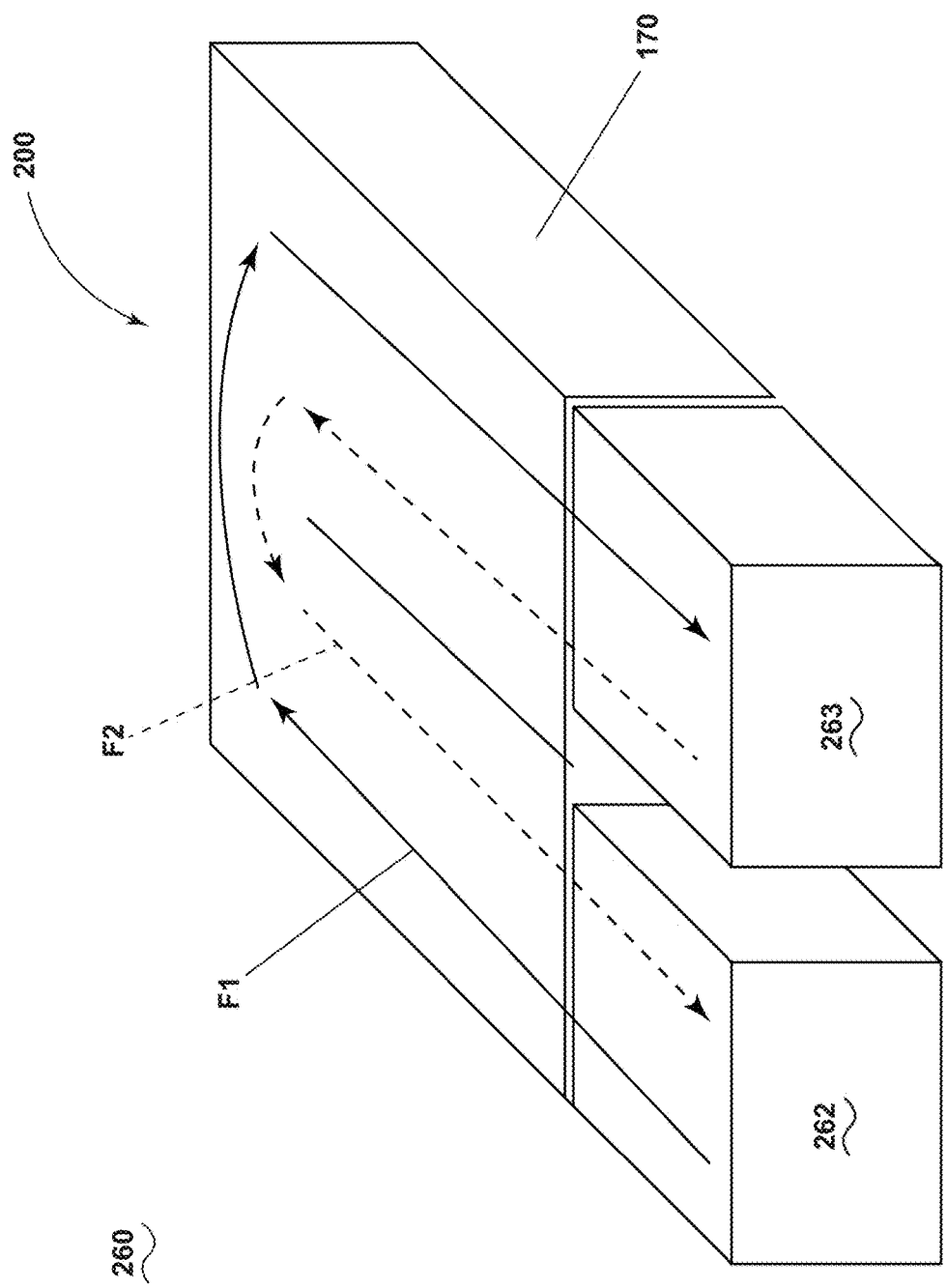
FIG. 20 is a heat exchanger having a core with a single u-bend channel configuration from FIG. 17 according to an aspect of the disclosure herein.

Turning to FIG. 20, a heat exchanger 260 having a core 170 with a single u-bend channel configuration 200 according to an aspect of the disclosure herein is illustrated.

Figure 21:
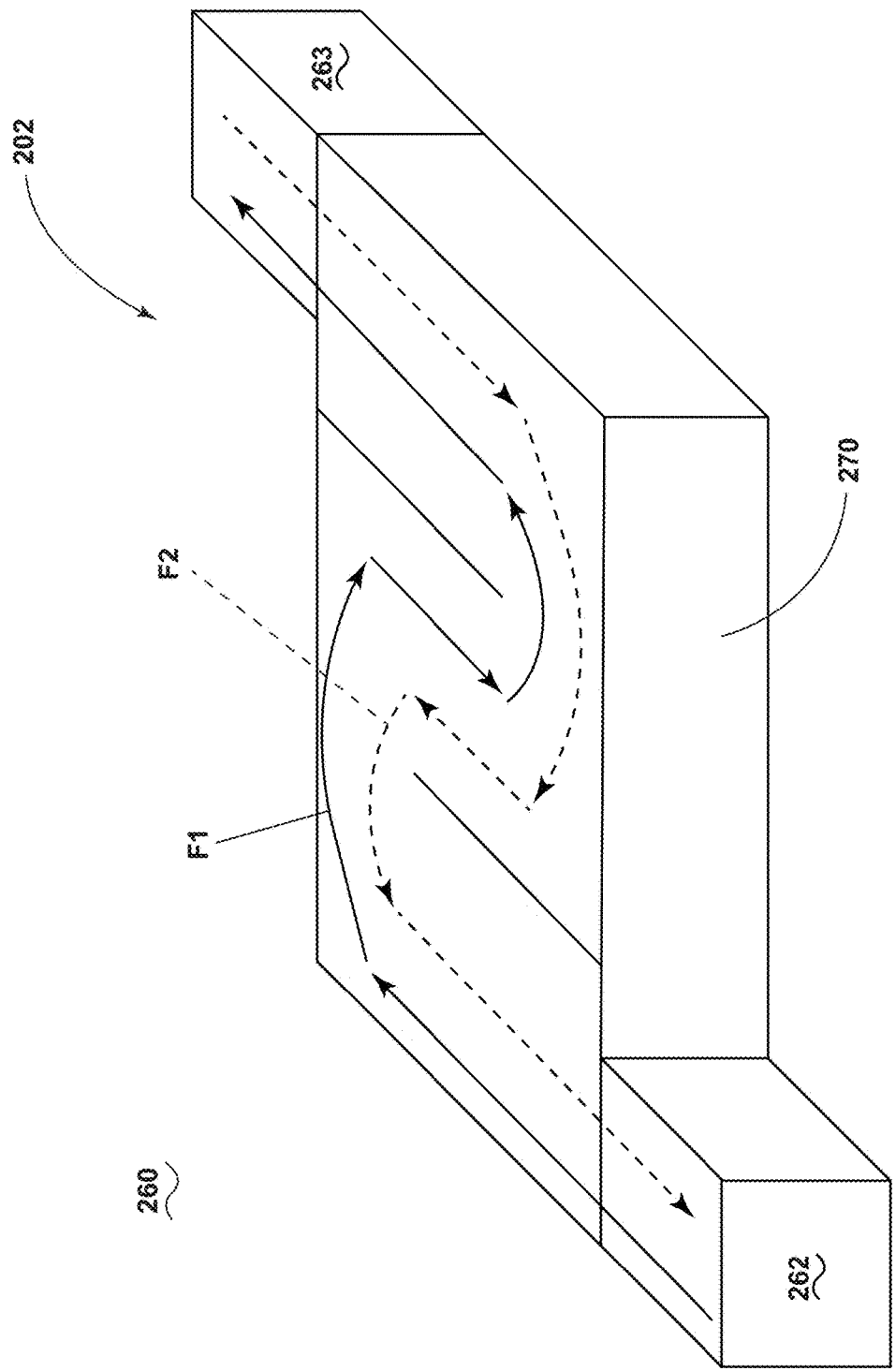
FIG. 21 is a heat exchanger having a core with a double u-bend channel configuration from FIG. 17 according to another aspect of the disclosure herein.

Turning to FIG. 21, a heat exchanger 260 having a core 270 with a double u-bend channel configuration 202 according to an aspect of the disclosure herein is illustrated. The straight, single u-bend, and double u-bend channel configurations illustrated in FIG. 17, FIG. 20, and FIG. 21 respectively, are provided as examples. Nonetheless, any of the unit-cells earlier discussed can be assembled into any channel configuration to form the desired flow path.

Figure 22:
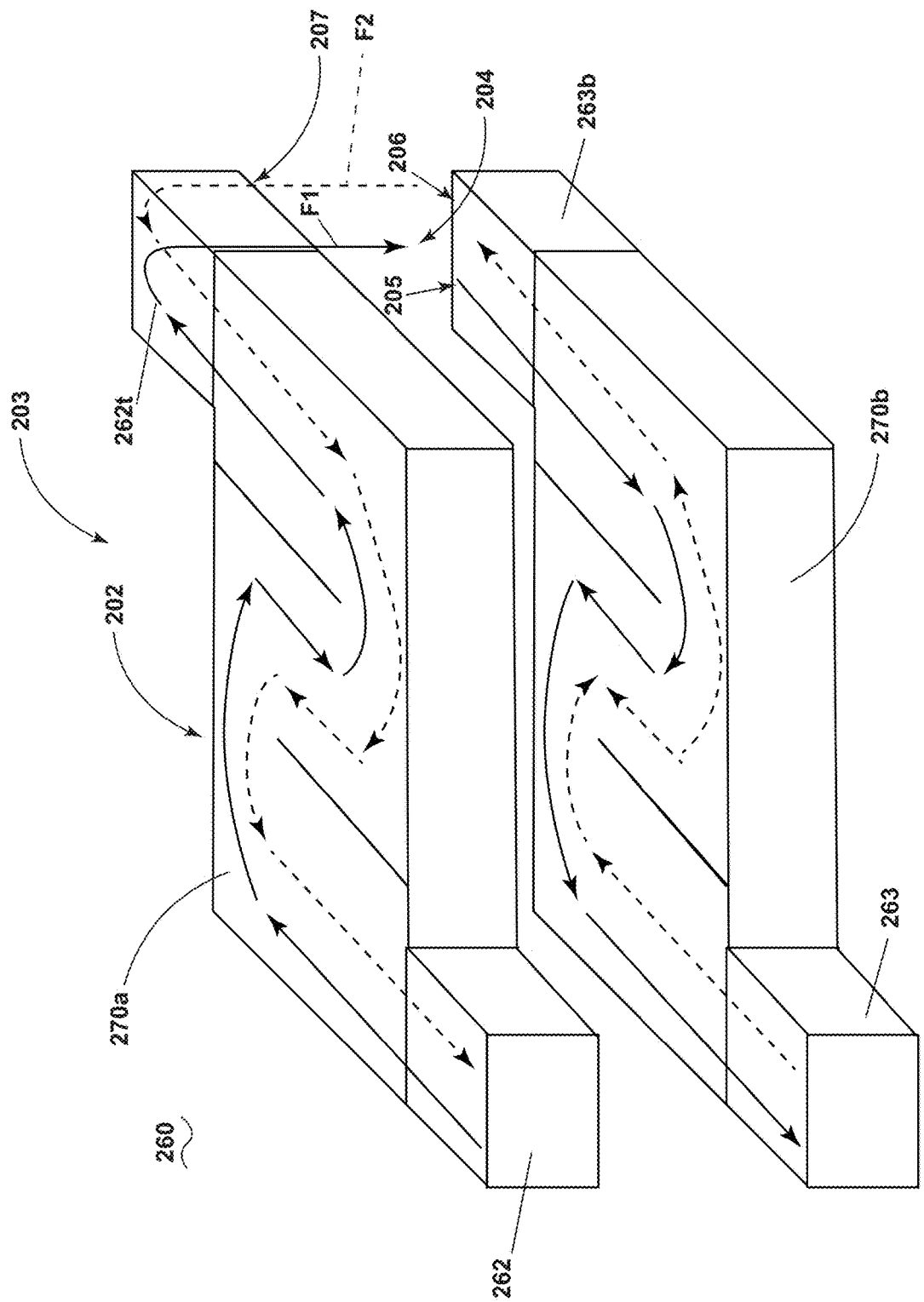
FIG. 22 is the heat exchanger having a core with a double u-bend flow configuration of FIG. 21 in a stacked orientation for the heat exchanger from FIG. 17 according to yet another aspect of the disclosure herein.

FIG. 22 is a heat exchanger 260 having a top core 270a and a bottom core 270b with a double u-bend channel configuration 202 in a stacked orientation 203 to form a series-connected heat exchanger pair according to another aspect of the disclosure herein. The top core 270a includes a top connecting manifold 262t and the bottom core 270b includes a bottom connecting manifold 263b. To enable flow connection of the first fluid flow path (F1) between the top and bottom cores 270a, 270b, an outlet 204 of the top connecting manifold 262t is in flow communication with an inlet 205 of the bottom connecting manifold 263b. Similarly, an outlet 206 of the bottom connecting manifold 263b is in flow communication with an inlet 207 of the top connecting manifold 262t to enable flow connection of the second fluid flow path (F2) between the two exchanger cores 270a, 270b. In this manner, the top and bottom cores are serially connected.

Further, this stacked arrangement can enable a parallel arrangement of multiple pairs of heat exchangers. The series connection along with the parallel arrangement limits pressure drop while resulting in a compact unit of multiple pairs of heat exchangers. For example, a group of 10 exchanger pairs each delivering 100 kW (i.e. each core in the pair delivers 50 kW), can supply a total of 1 MW of heat duty within a very compact space.

Each of the arrangements of FIG. 20-22 can be associated with heat exchanger 260 as indicated. In other words, the first and second manifolds 262, 263 as described previously are part of each arrangement as illustrated.

Figure 23:
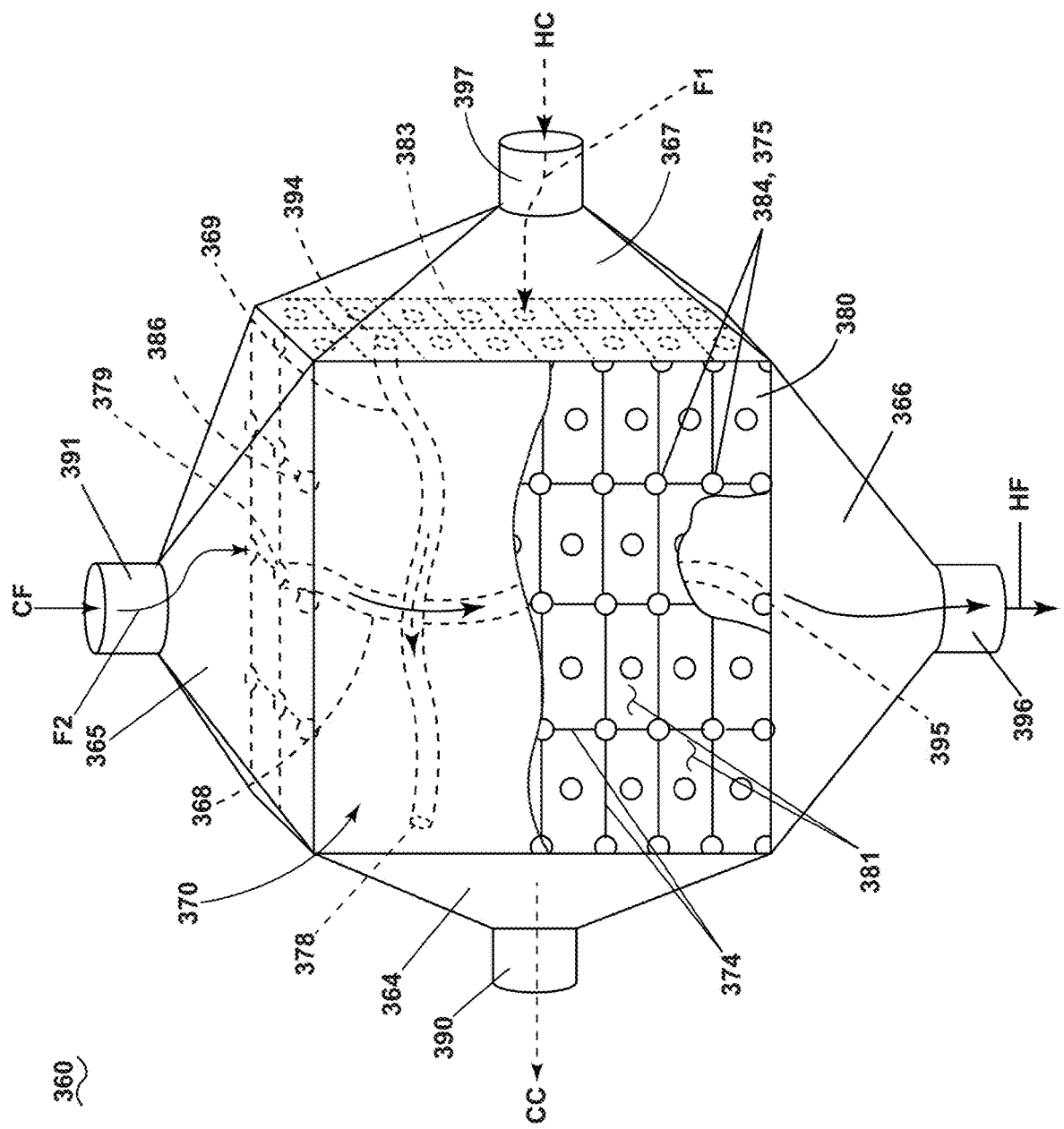
FIG. 23 is an isometric view of a heat exchanger extending between multiple manifolds and having a core defined by a plurality of unit-cells according to yet another aspect of the disclosure herein.

Turning to FIG. 23, an isometric view of a heat exchanger 360 according to an aspect of the disclosure herein is illustrated. The heat exchanger 360 is substantially similar to the heat exchanger 60 of FIG. 4, therefore, like parts will be identified with like numerals increased by 300. It should be understood that the description of the like parts of the heat exchanger 60 applies to the heat exchanger 360 unless otherwise noted. Further, a unit-cell 380 defines a core 370 of the heat exchanger 360. The unit-cell 380 can be the unit-cell 80, or the unit-cell 180 as previously described herein with like parts identified with like numerals increased by 300 and 200 respectively.

The heat exchanger 360 includes the core 370. The core 370 is defined by a plurality of unit-cells 380 including individual unit-cells 380 assembled in flow communication with each other, each unit-cell 380 having a plurality of faces 381 and a plurality of corners 384. The faces 381 and corners 384 meeting to define face junctions 374 and corner junctions 375, respectively.

The heat exchanger 360 includes first and second inlet manifolds 365, 367 and first and second outlet manifolds 364, 366. Unlike the heat exchanger 260 previously described, the first and second inlet manifolds 365, 367 and the first and second outlet manifolds 364, 366 do not share common partitions. Rather, the first and second inlet manifolds 365, 367 are oriented perpendicular to and separate from each other. In other words, the first inlet manifold 365 is fluidly coupled to one side of the core 370 while the second inlet manifold 367 is coupled to completely different side of the core 370. Likewise, the first and second outlet manifolds 364, 366 are also oriented perpendicular to and separate from each other, each fluidly coupled to a different side of the core 370.

A set of corner openings 386 is provided at the corners 384 facing the first inlet manifold 365 to define a first set of inlet openings 379. Another set of corner openings 386 is provided at the corners 384 facing the second outlet manifold 366 to define a first set of outlet openings 395. The set of corner openings 386 on sequential unit-cells 380 meet up to define a first set of channels 368. The first set of channels 368 fluidly couples the first inlet openings 379 to the first set of outlet openings 395 and in turn the first inlet manifold 365 and first inlet nozzle 391 to the second outlet manifold 366 and second outlet nozzle 396.

A set of face openings 383 is provided on the faces 381 facing the second inlet manifold 367 to define a second set of inlet openings 394. Another set of face openings 383 (not shown) is provided on the faces 381 (not shown) facing the first outlet manifold 364 to define a second set of outlet openings 378. The set of face openings 383 on sequential unit-cells 380 meet up to define a second set of channels 369.

The second set of channels 369 fluidly couples the second set of inlet openings 394 to the second set of outlet openings 378 and in turn the second inlet manifold 367 and a second inlet nozzle 397 to the first outlet manifold 364 and a first outlet nozzle 390.

Overall, first and second fluid flow paths, (F1 dashed arrows, F2 solid arrows) for channeling the cooling fluid (Fc) run in crossflow directions with respect to each other. The incoming cold fuel (CF) and the outgoing cold carbon dioxide (CC) can run generally perpendicular to each other as does the incoming hot carbon dioxide (HC) and the outgoing hot fuel (HF).

As described earlier, finding a workable solution that balances weight and size with performance involves finding the balance between effective cooling and engine performance by way of the heat exchangers described herein. This is a labor- and time-intensive process, because the process is iterative and involves the selection of various heat exchanger layouts designed for (in one example) flight idle, and then evaluating whether at other times in flight (e.g. non-flight idle) the heat exchanger provides acceptable cooling performance for the engine. In some examples, a heat exchanger provides acceptable cooling performance compared to a baseline cooling performance but with unacceptable weight and size increase. Heat exchangers have often been selected accordingly for individual performance requirements prior to a heat exchanger that satisfies all design requirements, e.g. cooling performance, aerodynamic performance, pressure ratio, rigidity, durability, thermal stresses, noise transmission levels, or the like. The inventor sought to find the trade-off balance between cooling performance and engine efficiency while satisfying all design requirement, because this would yield a more desired heat exchanger suited for specific needs of the engine, as described above. Knowing these trade-off is also a desirable time saver.

TABLE 1 below illustrates some heat exchanger configurations that yielded workable solutions to the trade-off balance problem.

TABLE 1

| | Example: | | | | | |
|---|---|---|---|---|---|---|
| | 1 | 2 | 3 | 4 | 5 | 6 |
| $N_{fc}$ (—) | 36 | 30 | 24 | 22 | 18 | 12 |
| $N_{cc}$ (—) | 24 | 15 | 16 | 16 | 12 | 8 |
| $D_{fc}$ (mm) | 10 | 15 | 5.7 | .5 | .5 | 1 |
| $D_{cc}$ (mm) | 10 | 11 | 4.4 | .75 | .75 | 1 |
| $D_{fj}$ (mm) | 20 | 17 | 11.4 | 1.5 | 1.3 | 2 |
| $D_{cj}$ (mm) | 20 | 13 | 8.8 | 1.75 | 1.5 | 2 |
| $L_{uh}$ (mm) | 50 | 46.6 | 5.63 | 9.17 | 3 | 5 |
| $L_{fd}$ (mm) | 70.71 | 65 | 31.5 | 20 | 5.34 | 7.07 |
| $L_{ud}$ (mm) | 86.6 | 80 | 32 | 22 | 6.13 | 8.66 |

It was discovered, unexpectedly, during the course of engine design and the time-consuming iterative process previously described, that a relationship exists between the ratio of the number of face channels vs corner channels ($N_{fc}/N_{cc}$), the ratio of the size of face channel diameters vs corner channel diameters ($D_{fc}/D_{cc}$), the ratio of the size of face junction diameters vs corner junction diameters ($D_{fj}/D_{cj}$), and the ratio of the value of the unit-cell diagonal vs the face diagonal ($L_{ud}/L_{fd}$). Such a relationship can narrow the vast range of possible heat exchangers down to a range providing working solutions with a desired degree of thermal efficiency. After conducting numerous studies at transient flight conditions (e.g., take-off and approach), it was found that a specific range of unit-cell configurations enable a high heat transfer surface for any of the previously described heat exchangers, resulting in a highly useful and desirable engine with respect to cooling performance, aerodynamic performance, durability, and cycle life for the engine.

Moreover, utilizing this relationship, the inventor found that the number of suitable or feasible heat exchangers possibilities for placement in a turbine engine that are capable of meeting the design requirements could be greatly reduced, thereby facilitating a more rapid down-selection of heat exchangers to consider as an engine is being developed. Such benefit provides more insight to the requirements for a given engine, and to the requirements for particular component locations within the engine, long before specific technologies, integration, or system requirements are developed fully. The discovered relationship also avoids or prevents late-stage redesign while also providing a heat exchanger design that integrates cooling performance, heat transfer effectiveness, and size compactness. The desired relationship is represented by a unit-cell sizing parameter (denoted "USP") in accordance with the following expression:

$$USP = \left(\frac{N_{fc}}{N_{cc}}\right) \times \left(\frac{D_{fc}}{D_{cc}}\right) \times \left(\frac{D_{fj}}{D_{cj}}\right) \times \left(\frac{L_{ud}}{L_{fd}}\right) \quad \text{Expression (1)}$$

The shapes of unit-cells are narrowed to those which can be tessellating prisms ranging from six sides (cubes) to fourteen sides (dodecagonal prism). In other words, the unit-cells can have a different number of faces, wherein some of the faces have face edges that range between 4 and 12. This, in turn, allows the ratio of face channels vs corner channels ($N_{fc}/N_{cc}$) to range between or equal to 0.5 and 6. Depending on diameter values, the ratio of face channel diameters vs corner channel diameters ($D_{fc}/D_{cc}$) and the ratio of face junction diameters vs corner junction diameters ($D_{fj}/D_{cj}$) ranges between or is equal to 0.25 and 4. Finally, depending on the diagonal values, the unit-cell diagonal vs the face diagonal ($L_{ud}/L_{fd}$) ranges between or is equal to 1.016 and 3.

In one example, the unit-cell 80 illustrated in FIG. 6 and Example 6 of TABLE 1, has a number of face channels ($N_{fc}$) of 12 and a number of corner channels ($N_{cc}$) of 8, resulting in the ratio of the number of face channels vs the number of corner channels ($N_{fc}/N_{cc}$) being 1.5. The face channel diameter ($D_{fc}$) is 1 mm, and the corner channel diameter ($D_{cc}$) is 1 mm, resulting in the ratio of face channel diameters vs corner channel diameters ($D_{fc}/D_{cc}$) being 1. Additionally, the face junction diameter ($D_{fj}$) is 2 mm and the corner junction diameter ($D_{cj}$) is 2 mm, resulting in the ratio of face junction diameters vs corner junction diameters ($D_{fj}/D_{cj}$) being 1. Finally, the face diagonal ($L_{fd}$) is 7.07 mm and the unit-cell diagonal ($L_{ud}$) is 8.66 mm, resulting in the ratio of the unit-cell diagonal vs the face diagonal ($L_{ud}/L_{fd}$) being 1.225. Accordingly, for the unit-cell 80, the USP is 1.837.

In another example, the unit-cell 180 illustrated in FIG. 13 and Example 5 of TABLE 1 has a number of face channels ($N_{fc}$) of 18 and a number of corner channels ($N_{cc}$) of 12, resulting in the ratio of the number of face channels vs the number of corner channels ($N_{fc}/N_{cc}$) being 1.5. The face channel diameter ($D_{fc}$) is 0.5 mm, and the corner channel diameter ($D_{cc}$) is 0.75 mm, resulting in the ratio of face channel diameters vs corner channel diameters ($D_{fc}/D_{cc}$) being 0.667. Additionally, the face junction diameter ($D_{fj}$) is 1.3 mm, and the corner junction diameter ($D_{cj}$) is 1.5 mm, resulting in the ratio of face junction diameters vs corner junction diameters ($D_{fj}/D_{cj}$) being 0.867. Finally, the face diagonal ($L_{fd}$) is 5.34 mm, and the unit-cell diagonal ($L_{ud}$) is 6.13 mm, resulting in the ratio of the unit-cell diagonal vs the face diagonal ($L_{ud}/L_{fd}$) being 1.147. Accordingly, the unit-cell 180, the USP is 0.994.

Some lower and upper bound values for each design parameter in Expression (1) are provided below in TABLE 2:

TABLE 2

| Parameter | Lower Bound | Upper Bound |
|---|---|---|
| $N_{fc}$ (—) | 4 | 36 |
| $N_{cc}$ (—) | 2 | 24 |
| $D_{fc}$ (mm) | 0.1 | 10 |
| $D_{cc}$ (mm) | 0.1 | 10 |
| $D_{fj}$ (mm) | 0.2 | 20 |
| $D_{cj}$ (mm) | 0.2 | 20 |
| $L_{fd}$ (mm) | 0.71 | 70.71 |
| $L_{ud}$ (mm) | 0.87 | 86.60 |

It was found that unit-cells with dimensions fitting in the ranges set out in TABLE 3 below are part of the core for the heat exchangers previously described herein. These ranges enable a high heat transfer surface area for a compact and highly efficient heat exchanger.

TABLE 3

| Ratio | Narrow Range | Broad Range |
|---|---|---|
| USP | 0.09-12.73 | 0.09-97.49 |
| $N_{fc}/N_{cc}$ | 0.5-3 | 0.5-6 |
| $D_{fc}/D_{cc}$ | 0.25-2 | 0.25-4 |
| $D_{fj}/D_{cj}$ | 0.25-2 | 0.25-4 |
| $L_{ud}/L_{fd}$ | 1.02-1.23 | 1.02-3 |

The unit-cells within the ranges provided can be assembled to conform with any flow path and enable multiple flow branches with localized turbulence to enhance heat transfer. The unit-cells can be located within any of the manifold options previously described herein, one that fits on different ends of the core and the that can handle two flow paths (F1, F2) to enable compact arrangement of multiple exchanger units. It should be understood that the USP describes unit-cells in heat exchangers that use various cooling fluids aside from the fuel/$sCO_2$ heat exchangers. The unit-cell core configuration can define a heat exchanger for processing other fluid applications.

The USP is useful for making trade-offs when sizing a heat exchanger based on competing requirements for heat load capability, pressure drop availability, compactness, heat transfer effectiveness, etc. For example, when there is a limited allowable pressure drop or there is need for similar flowrates in the flow channels of both flow paths (F1, F2), then a lower USP value or narrow USP range is desired with a trade-off of lower exchanger compactness. However, when there is need for a highly compact heat exchanger with a large heat transfer surface area, then a higher USP value or broad USP range is desired with a trade-off of high pressure drop.

Benefits associated with the USP described herein include a quick assessment of design parameters in terms of unit-cell geometry. Further, the USP described herein enables a quick visualization of tradeoffs in terms of geometry that are bounded by the constraints imposed by the materials used, the available space in which the heat exchanger is located, and the fluid flow direction possibilities which is determined by the component or system enclosures and the configuration of surrounding components, or any other design constraint. The USP enables the manufacturing of a high performing heat exchanger with peak performance with the factors available. While narrowing these multiple factors to a region of possibilities saves time, money, and resources, the largest benefit is at the system level, where higher-efficiency heat exchangers enable improved system performance. Previously developed heat exchangers may peak in one area of performance by design, but lose efficiency or lifetime benefits in another area of performance. In other words, the unit-cell size parameter enables the development and production of higher performing heat exchangers across multiple performance metrics within a given set of constraints.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A heat exchanger comprising a plurality of unit-cells, each unit-cell defined by a body having a plurality of faces and corners, a first set of channels formed in the body and having face openings on each of the faces and face channels extending through the body connecting immediately adjacent face openings to define a first three-dimensional flow matrix surrounding a center of the body; and a second set of channels formed in the body and having corner openings on each of the corners, a middle distribution chamber located at the center, and corner channels extending through the body fluidly connecting the corner openings to the middle distribution chamber to define a second three-dimensional flow matrix; wherein a maximum diagonal along one of the faces defines a face diagonal ($L_{fd}$), a maximum diagonal through the center of the body between two diagonally opposing corners defines a unit-cell diagonal ($L_{ud}$), the face channels define a face channel diameter ($D_{fc}$), the corner channels define a corner channel diameter ($D_{cc}$), at least two face openings meet at a face junction to define a face junction diameter ($D_{fj}$), and at least two corner openings meet at a corner junction to define a corner junction diameter ($D_{cj}$), and wherein a ratio ($N_{fc}/N_{cc}$) is defined as the number of face channels ($N_{fc}$) to the number of corner channels ($N_{cc}$), a ratio ($D_{fc}/D_{cc}$) is defined as the face channel diameter ($D_{fc}$) to the corner channel diameter ($D_{cc}$), a ratio ($D_{fj}/D_{cj}$) is defined by the face junction diameter ($D_{fj}$) to the corner junction diameter ($D_{cj}$), a ratio ($L_{ud}/L_{fd}$) is defined by the unit-cell diagonal ($L_{ud}$) to the face diagonal ($L_{fd}$), and the unit-cell is sized such that it has an unit-cell sizing parameter (USP) with a value greater than or equal to 0.09 and less than or equal to 97.49 (0.09≤USP≤97.49) as defined by the expression:

$$USP = \frac{N_{fc}}{N_{cc}} \cdot \frac{D_{fc}}{D_{cc}} \cdot \frac{D_{fj}}{D_{cj}} \cdot \frac{L_{ud}}{L_{fd}},$$

wherein (0.09 ≤ USP ≤ 97.49).

The heat exchanger of any preceding clause wherein each unit-cell is in flow communication with adjacent unit-cells, wherein the first three-dimensional flow matrix defines a first fluid flow path surrounding the corner junction and the middle distribution chamber of the second set of channels, and wherein the second three-dimensional flow matrix defines a second fluid flow path surrounding the face junction of the first set of channels.

The heat exchanger of any preceding clause wherein the plurality of unit-cells are assembled to define a core of the heat exchanger, and wherein the first three-dimensional flow matrix and the second three-dimensional flow matrix define alternating patterns to form a three-dimensional interlocking mesh of the face channels and corner channels throughout the core.

The heat exchanger any preceding clause wherein the first fluid flow path and the second fluid flow path are in crossflow direction relative to each other within each unit-cell.

The heat exchanger any preceding clause wherein the USP has a value greater than or equal to 0.09 and less than or equal to 12.73 (0.09≤USP≤12.73).

The heat exchanger of any preceding clause wherein the ratio of the number of face channels to the number of corner channels ($N_{fc}/N_{cc}$) is between or equal to 0.5 and 6, the ratio of the face channel diameter to the corner channel diameter ($D_{fc}/D_{cc}$) is between or equal to 0.25 and 4, the ratio of the face junction diameter to the corner junction diameter ($D_{fj}/D_{cj}$) is between or equal to 0.25 and 4, and the ratio of the unit-cell diagonal to the face diagonal ($L_{ud}/L_{fd}$) is between or equal to 1.02 and 3.

The heat exchanger of any preceding clause wherein the ratio of the number of face channels to the number of corner channels ($N_{fc}/N_{cc}$) is between or equal to 0.5 and 3, the ratio of the face channel diameter to the corner channel diameter ($D_{fc}/D_{cc}$) is between or equal to 0.25 and 2, the ratio of the face junction diameter to the corner junction diameter ($D_{fj}/D_{cj}$) is between or equal to 0.25 and 2, and the ratio of the unit-cell diagonal to the face diagonal ($L_{ud}/L_{fd}$) is between or equal to 1.02 and 1.23.

The heat exchanger of any preceding clause wherein the plurality of unit-cells defines a core disposed between a first manifold and a second manifold, wherein the number of face channels define an amount of the first set of channels fluidly connected to the first manifold and the second manifold and the number of corner channels define an amount of the second set of channels fluidly connected to the first manifold and the second manifold.

The heat exchanger of any preceding clause wherein the first set of channels and the second set of channels define either a countercurrent flow path direction, a co-current flow path direction, or a cross flow path direction relative to each other between the first manifold and the second manifold.

The heat exchanger of any preceding clause wherein the first manifold comprises a first inlet manifold and a first outlet manifold separated by a first partition, wherein the second manifold comprises a second inlet manifold and a second outlet manifold separated by a second partition.

The heat exchanger of any preceding clause wherein the first set of channels is fluidly connected to the first inlet manifold and the second outlet manifold and wherein the second set of channels is fluidly connected to the second inlet manifold and the first outlet manifold and wherein the first inlet manifold and the first outlet manifold are parallel to each other, and wherein the second inlet manifold and the second outlet manifold are parallel to each other.

The heat exchanger in any preceding clause wherein the first set of channels is fluidly connected to the first inlet manifold and the second outlet manifold and wherein the second set of channels is fluidly connected to the second inlet manifold and the first outlet manifold and wherein the first inlet manifold and the second inlet manifold are perpendicular to each other and wherein the first outlet manifold and the second outlet manifold are perpendicular to each other.

The heat exchanger of any preceding clause wherein the core comprises a straight channel configuration, a single u-bend channel configuration or a double u-bend channel configuration.

The heat exchanger of any preceding clause wherein the heat exchanger is part of a thermal management system in a turbine engine.

A heat exchanger comprising a plurality of unit-cells, each unit-cell defined by a body having a plurality of faces and corners, a first set of channels formed in the body and having face openings on each of the faces where face channels extend through the body connecting immediately adjacent face openings to define a first three-dimensional flow matrix surrounding a center of the body; and a second set of channels formed in the body and having corner openings on each of the corners, a distribution chamber located at the center, where corner channels extend through the body fluidly connecting the corner openings to the distribution chamber to define a second three-dimensional flow matrix.

The heat exchanger of any preceding clause wherein the faces comprise a top face, a bottom face, and a plurality of side faces and a meeting of at least two side faces and one of the top or bottom faces forms a corner of the plurality of corners.

The heat exchanger of any preceding clause wherein the face channels define a first fluid flow path through the body and the corner channels define a second fluid flow path through the body.

The heat exchange of any preceding clause wherein adjacent unit-cells are fluidly connected at the face openings to define the first set of channels and are fluidly connected at the corner openings to define the second set of channels.

The heat exchanger of any preceding clause wherein the unit-cells are arranged in abutting relationship to form a pair of confronting faces, and the face openings of a corresponding one of the pairs of confronting faces, collectively form a face distribution chamber.

The heat exchanger of any preceding clause wherein the unit-cells are arranged in abutting relationship to form groups of confronting corners, and the corner openings, of a corresponding one of the groups of confronting corners, collectively form a corner distribution chamber.

The heat exchanger of any preceding clause wherein the shapes of unit-cells are narrowed to those which can be tessellating prisms ranging from six sides to fourteen sides.

The heat exchanger of any preceding clause wherein the unit-cells can have a different number of faces and wherein some of the faces have face edges that range between 4 and 12.

The heat exchanger wherein the corner junction diameter ($D_{cj}$) is equal to the middle junction diameter ($D_{mj}$).

The heat exchanger wherein the corner junction diameter ($D_{cj}$) is different than the middle junction diameter ($D_{mj}$).

The heat exchanger of any preceding clause wherein a first heat exchanger with a double u-bend configuration is paired with a second heat exchanger with the same configuration, wherein the first outlet manifold of the first heat exchanger is in flow communication with the first inlet manifold of the second exchanger and wherein the first outlet manifold of the second heat exchanger is in flow communication with the first inlet manifold of the first exchanger.

The heat exchanger of any preceding clause wherein the first outlet manifold of the first heat exchanger is not in flow communication with the first inlet manifold of the second exchanger and wherein the first outlet manifold of the second heat exchanger is not in flow communication with the first inlet manifold of the first exchanger.

The heat exchanger of any preceding clause further comprising a first manifold and a second manifold where the first and second set of channels extend between the first manifold and the second manifold such that the first fluid flow path is either in countercurrent, co-current, or crossflow direction with the second fluid flow path.

I claim:

1. A heat exchanger comprising:
a plurality of unit-cells, each unit-cell defined by a body having a plurality of faces and corners;
a first set of channels formed in the body and having face openings on each of the faces and face channels extending through the body connecting immediately adjacent face openings to define a first three-dimensional flow matrix surrounding a center of the body; and
a second set of channels, fluidly separate from the first set of channels, formed in the body and having corner openings on each of the corners, a middle distribution chamber located at the center, and corner channels extending through the body fluidly connecting the corner openings to the middle distribution chamber to define a second three-dimensional flow matrix;
wherein a maximum diagonal along one of the faces defines a face diagonal ($L_{fd}$), a maximum diagonal through the center of the body between two diagonally opposing corners defines a unit-cell diagonal ($L_{ud}$), the face channels define a face channel diameter ($D_{fc}$), the corner channels define a corner channel diameter ($D_{cc}$), at least two face openings meet at a face junction to define a face junction diameter ($D_{fj}$), and at least two corner openings meet at a corner junction to define a corner junction diameter ($D_{cj}$); and
wherein a ratio ($N_{fc}/N_{cc}$) is defined as the number of face channels ($N_{fc}$) to the number of corner channels ($N_{cc}$), a ratio ($D_{fc}/D_{cc}$) is defined as the face channel diameter ($D_{fc}$) to the corner channel diameter ($D_{cc}$), a ratio ($D_{fj}/D_{cj}$) is defined by the face junction diameter ($D_{fj}$) to the corner junction diameter ($D_{cj}$), a ratio ($L_{ud}/L_{fd}$) is defined by the unit-cell diagonal ($L_{ud}$) to the face diagonal ($L_{fd}$), and the unit-cell is sized such that it has a unit-cell sizing parameter (USP) with a value greater than or equal to 0.09 and less than or equal to 97.49 ($0.09 \leq USP \leq 97.49$) as defined by the expression:

$$USP = \frac{N_{fc}}{N_{cc}} \cdot \frac{D_{fc}}{D_{cc}} \cdot \frac{D_{fj}}{D_{cj}} \cdot \frac{L_{ud}}{L_{fd}},$$

wherein $(0.09 \le USP \le 97.49)$.

2. The heat exchanger of claim 1 wherein each unit-cell is in flow communication with adjacent unit-cells, wherein the first three-dimensional flow matrix defines a first fluid flow path surrounding the corner junction and the middle distribution chamber of the second set of channels, and wherein the second three-dimensional flow matrix defines a second fluid flow path surrounding the face junction of the first set of channels.

3. The heat exchanger of claim 2 wherein the plurality of unit-cells are assembled to define a core of the heat exchanger, and wherein the first three-dimensional flow matrix and the second three-dimensional flow matrix define alternating patterns to form a three-dimensional interlocking mesh of the face channels and corner channels throughout the core.

4. The heat exchanger of claim 3 wherein the first fluid flow path and the second fluid flow path are in crossflow direction relative to each other within each unit-cell.

5. The heat exchanger of claim 1 wherein the USP has a value greater than or equal to 0.09 and less than or equal to 12.73 ($0.09 \le USP \le 12.73$).

6. The heat exchanger of claim 1 wherein the ratio of the number of face channels to the number of corner channels ($N_{fc}/N_{cc}$) is between or equal to 0.5 and 6, the ratio of the face channel diameter to the corner channel diameter ($D_{fc}/D_{cc}$) is between or equal to 0.25 and 4, the ratio of the face junction diameter to the corner junction diameter ($D_{fj}/D_{cj}$) is between or equal to 0.25 and 4, and the ratio of the unit-cell diagonal to the face diagonal ($L_{ud}/L_{fd}$) is between or equal to 1.02 and 3.

7. The heat exchanger of claim 1 wherein the ratio of the number of face channels to the number of corner channels ($N_{fc}/N_{cc}$) is between or equal to 0.5 and 3, the ratio of the face channel diameter to the corner channel diameter ($D_{fc}/D_{cc}$) is between or equal to 0.25 and 2, the ratio of the face junction diameter to the corner junction diameter ($D_{fj}/D_{cj}$) is between or equal to 0.25 and 2, and the ratio of the unit-cell diagonal to the face diagonal ($L_{ud}/L_{fd}$) is between or equal to 1.02 and 1.23.

8. The heat exchanger of claim 1 wherein the plurality of unit-cells defines a core disposed between a first manifold and a second manifold, wherein the number of face channels define an amount of the first set of channels fluidly connected to the first manifold and the second manifold and the number of corner channels define an amount of the second set of channels fluidly connected to the first manifold and the second manifold.

9. The heat exchanger of claim 8 wherein the first set of channels and the second set of channels define either a countercurrent flow path direction, a co-current flow path direction, or a cross flow path direction relative to each other between the first manifold and the second manifold.

10. The heat exchanger of claim 9 wherein the first manifold comprises a first inlet manifold and a first outlet manifold separated by a first partition, wherein the second manifold comprises a second inlet manifold and a second outlet manifold separated by a second partition.

11. The heat exchanger of claim 10 wherein the first set of channels is fluidly connected to the first inlet manifold and the second outlet manifold and wherein the second set of channels is fluidly connected to the second inlet manifold and the first outlet manifold and wherein the first inlet manifold and the first outlet manifold are parallel to each other, and wherein the second inlet manifold and the second outlet manifold are parallel to each other.

12. The heat exchanger in claim 10 wherein the first set of channels is fluidly connected to the first inlet manifold and the second outlet manifold and wherein the second set of channels is fluidly connected to the second inlet manifold and the first outlet manifold and wherein the first inlet manifold and the second inlet manifold are perpendicular to each other and wherein the first outlet manifold and the second outlet manifold are perpendicular to each other.

13. The heat exchanger of claim 8 wherein the core comprises a straight channel configuration, a single u-bend channel configuration or a double u-bend channel configuration.

14. The heat exchanger of claim 1 wherein the heat exchanger is part of a thermal management system in a turbine engine.

15. A heat exchanger comprising:
a plurality of unit-cells, each unit-cell defined by a body having a plurality of faces and corners;
a first set of channels formed in the body and having face openings on each of the faces where face channels extend through the body connecting immediately adjacent face openings to define a first three-dimensional flow matrix surrounding a center of the body; and
a second set of channels, fluidly separate from the first set of channels, formed in the body and having corner openings on each of the corners, a distribution chamber located at the center, where corner channels extend through the body fluidly connecting the corner openings to the distribution chamber to define a second three-dimensional flow matrix.

16. The heat exchanger of claim 15 wherein the faces comprise a top face, a bottom face, and a plurality of side faces and a meeting of at least two side faces and one of the top or bottom faces forms a corner of the plurality of corners.

17. The heat exchanger of claim 15 wherein the face channels define a first fluid flow path through the body and the corner channels define a second fluid flow path through the body.

18. The heat exchange of claim 17 wherein adjacent unit-cells are fluidly connected at the face openings to define the first set of channels and are fluidly connected at the corner openings to define the second set of channels.

19. The heat exchanger of claim 18 wherein the unit-cells are arranged in abutting relationship to form a pair of confronting faces, and the face openings of a corresponding one of the pairs of confronting faces, collectively form a face distribution chamber.

20. The heat exchanger of claim 19 wherein the unit-cells are arranged in abutting relationship to form groups of confronting corners, and the corner openings, of a corresponding one of the groups of confronting corners, collectively form a corner distribution chamber.

* * * * *